(12) United States Patent
Hoang

(10) Patent No.: US 7,468,134 B2
(45) Date of Patent: Dec. 23, 2008

(54) SEE-THRU SELF CLEANING BIOLOGICAL FILTER SYSTEM FOR AQUA-CULTURE

(76) Inventor: Hung Hoang, 6219 Gum St., Alexandria, VA (US) 22310

( * ) Notice: Subject to any disclaimer, the term of this patent is extended or adjusted under 35 U.S.C. 154(b) by 120 days.

(21) Appl. No.: 11/328,104

(22) Filed: Jan. 10, 2006

(65) Prior Publication Data

US 2006/0151366 A1    Jul. 13, 2006

Related U.S. Application Data

(60) Provisional application No. 60/642,098, filed on Jan. 10, 2005.

(51) Int. Cl.
  *C02F 3/00* (2006.01)
  *C02F 3/06* (2006.01)
  *B01D 24/00* (2006.01)
  *B01D 33/50* (2006.01)

(52) U.S. Cl. .................. 210/617; 210/95; 210/150; 210/287; 210/278; 210/170.02

(58) Field of Classification Search .............. None
See application file for complete search history.

(56) References Cited

U.S. PATENT DOCUMENTS

| | | | | |
|---|---|---|---|---|
| 1,947,777 A | * | 2/1934 | Huff et al. ............... 261/94 |
| 2,212,932 A | * | 8/1940 | Fairlie .................... 261/94 |
| 3,679,054 A | * | 7/1972 | Muller .................... 210/95 |
| 3,957,931 A | * | 5/1976 | Ellis et al. ............... 261/98 |
| 4,122,011 A | * | 10/1978 | Strigle, Jr. .............. 210/150 |
| 5,055,186 A | * | 10/1991 | Van Toever ............. 210/150 |
| 5,205,932 A | * | 4/1993 | Solomon et al. ........ 210/264 |
| 5,728,303 A | * | 3/1998 | Johnson .................. 210/695 |
| 6,042,725 A | * | 3/2000 | Serenko et al. ......... 210/266 |
| 6,090,285 A | * | 7/2000 | Chau ...................... 210/284 |
| 6,117,812 A | * | 9/2000 | Gao et al. ............... 502/159 |
| 6,126,829 A | * | 10/2000 | Gunnarsson et al. .... 210/616 |
| 6,231,762 B1 | * | 5/2001 | Marshall, III ........... 210/234 |
| 6,287,462 B1 | * | 9/2001 | Likos ................. 210/167.11 |
| 6,447,675 B1 | * | 9/2002 | James .................... 210/150 |
| 7,329,350 B2 | * | 2/2008 | James .................... 210/616 |

FOREIGN PATENT DOCUMENTS

WO    WO 2005040501 A1 *    5/2005

* cited by examiner

*Primary Examiner*—Krishnan S. Menon
*Assistant Examiner*—Madeline Gonzalez
(74) *Attorney, Agent, or Firm*—Maier & Maier, PLLC

(57) ABSTRACT

A system is described for collecting, filtering and removing dirt, debris, detritus, active organic materials, chemicals and toxins from water in fish ponds and general aqua-culture applications. This system includes a filter tank with supporting base containing biological filtration media, a multi-port valve, a strainer, a diffuser head, and a quick drain assembly. The filter tank is fabricated using transparent material allowing for visual inspection of the mechanical and biological activities inside the filter tank. The strainer and diffuser head are slotted so as to capture debris, retain filter media, and maintain unrestricted water flow. The quick drain is a vertical tube covered by drainage slots. The top end of the tube is capped. The bottom end of the tube extends through the filter tank wall to the exterior where a drain valve is attached. The biological filtration media are hollow plastic cylindrical structures with ridges on the external walls and free-standing fins on the internal walls that provide a high surface area-to-volume ratio and thus can support a high volumetric density of naturally occurring heterotrophic bacteria.

26 Claims, 24 Drawing Sheets

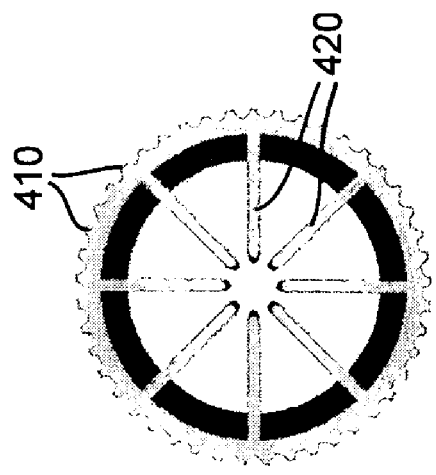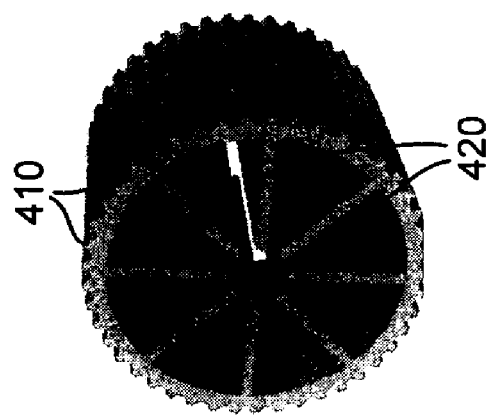
Figure 12A
Figure 12B

SEE-THRU SELF CLEANING BIOLOGICAL FILTER SYSTEM FOR AQUA-CULTURE

DESCRIPTION

This application claims the benefit of Provisional Application No. 60/642,098 of the same title filed on Jan. 10, 2005.

BACKGROUND OF THE INVENTION

1. Field of the Invention

The present invention relates to the field of ornamental landscaping and aqua-culture and, in particular, to a filter system to efficiently, mechanically filter and remove solid wastes, biologically converting harmful chemicals and toxins to a safe and fish-healthy environment.

2. Background Description

For many years fish pond owners have tried to find an easy way to clean and maintain their ponds. Water quality is the utmost important issue to all pond keepers. Without an adequate filtration system two things happen: One, the water will not stay clear. Decomposing or decaying debris, plants, or any organic matter will cloud the water, release toxic gases into the water, and consume oxygen. This promotes algae growth which in turn consumes even more oxygen from the water. Two, fish waste also produces toxins, and consumes oxygen and organic matter, thereby drastically reducing water quality. Without an adequate filtration system the fish will literally die in their own waste.

The most common filter is the simple up-flow filter—a large box filled with gravel or lava rocks. Water enters the bottom of the box and filters up through the gravel bed and then returns to the pond. It works reasonably well for a large pond with a small number of fish and is relatively inexpensive to build. However, cleaning a simple up-flow filter is untidy and inconvenient.

Designs of filters have advanced from the simple filter box to elaborate vortex chambers, settling tanks, tank after tank of filter pads, brushes (as mechanical and biological materials), to pressurized chambers. The quest for a better filter, one that not only cleans and filters water, but also provides convenience, requires less time to clean, and that is energy efficient goes on.

Pond owners have turned away from filter pads, which are dirty, messy, and require frequent attention, and moved to sealed pressurized tank systems with quick and easy-to-use multi-port control valves similar to those in sand filters. With the turn of a handle, the owner can quickly change the filter to cleaning mode, or vice versa.

Initially, sand filters were used for sealed pressurized tank systems. Using densely packed sand as a filter media, these systems provided an excellent means of removing dirt, debris, and organic materials. Sand also provided a large surface area which assisted biological filtration. However, there are three major drawbacks in using sand as a filter.

First, the sediments collected at the top layer of the sand often cake up and the water will find its way to the bottom of the filter by channeling through the sand. This renders the biological filtration ineffective. Second, sand requires frequent backwashing (as often as 2 to 3 times per day with heavy fish loads), which can be a great inconvenience. Finally, sand filtration requires a powerful water pump to push water through the sand bed. A suitable pump consumes considerable electrical energy.

More recently, pond-keepers have turned to "beads," another filter media, to clean and maintain their ponds. Beads are small and spherical in shape. Although beads do not quite match the filtration capabilities of sand, a bead filter still provides reasonable mechanical and biological filtration. It is more desirable because it offers greater convenience, reducing backwashing to only a few minutes every 7 to 10 days, and requires a smaller, more energy efficient pump.

A bead filter in a sealed pressurized tank contains a large number of small diameter plastic beads. The beads form a packed bed inside the filter that provides mechanical and biological filtration. Originally developed for the commercial aqua-culture industry, this type of filter is ideal for ponds with a large fish population. The common purpose of the many bead filters available today is to provide pond owners the most reliable, low-maintenance operation possible. However, there are still a few design limitations to the current state-of-the art systems available.

The "Bubble Bead Filter", manufactured by Fluid Arts since 1995, was one of the first bead filters on the market. The concept of floating material that could pack together in a very dense manner as a filter media and yet could be broken apart when cleaning was a needed revolution for the pond filter industry. This particular bead filter occupies a small footprint, (about four square feet at most) and is easy to clean. With blower systems, one can thoroughly remove all waste collected with a few steps.

The Bubble Bead Filter has the shape of an hour-glass Water enters at the bottom of the tank and exits at the top. In backwash mode, the pump is turned off, so no pond water enters the filter. A drain valve located at the bottom of the filter is opened to allow the water inside the filter to carry dirt and debris out of the tank through a drain. As the water level inside the filter tank lowers through the narrower neck of the hour-glass shape, the beads which became packed during the filtering operation are broken up. This "unpacking" loosens up the dirt and debris from the beads as water is drained from the tank. After draining, the drain valve is shut off, the pump is turned back on, and the container is filled up again. The backwashing mode is repeated 3 or 4 more times—or until the waste water becomes reasonably clear. This mode of cleaning of the filter requires time and considerable water.

The "Aqua Dyne Bead Filter" (AquaDynamite, Inc.) was introduced by Koi Camp in 1998. Although this filtration system uses a swimming pool filter, and, in fact, is built from the same tank and external fittings, it has been completely re-engineered internally. The diffuser column was fabricated with a multi-port control valve. With a turn of a handle on the control valve, the filter can be switched quickly to different modes, such as filtration, back-wash, re-circulation, waste, and so on. Water enters and exits through an easy-to-use multi-port valve. Attached to the bottom of the multi-port valve is a low friction central diffuser column that virtually eliminates the frequent clogging associated with other bead systems on the market. With the control valve set to filter, the water flows out of slots at the bottom of the diffuser column, passes through the floating beads where it is mechanically strained and biologically filtered, and then flows through slots at the top of the diffuser.

Unfortunately, there are several undesirable traits of these bead systems:

1) Over time, dirt, debris and other organic materials cause the floating beads to stick together and normal back-washing does not effectively remove all of the debris strained by the beads. Thus, especially in large tanks, a high flow volume air blower must be used to "unpack" the beads. This can create problems if the air blower is left on too long, (more than the seven minutes recommended by the manufacturer).

2) The air rising from the bottom to the top of the filter creates turbulence that scrubs away some of the beneficial bacteria on the surface of the beads. This causes a spike in ammonia and nitrite levels in the pond water that is considered stressful and may be dangerous to fish health. This elevated level of ammonia and nitrite in pond water may last as long as 3 to 5 days before filtration reduces it to a tolerable level. While the tight packing of the beads provides cleaner water, it also requires frequent cleaning of the filter every 7 to 10 days. So, while the bead filter is efficient, it also purges useful bacteria, limiting the overall effectiveness of the bead filter's biological filtration.

3) Bead media have a smooth outer surface and over time bacterial growth begins to form layers. The first layer of bacteria can be encapsulated by newer growth and can become anaerobic. This can impact fish health by consuming oxygen, lowering the pH level, increasing stress, and emitting harmful toxins into the water as underlying layers of bacteria decay.

4) Bead media are uniform in size. Thus they tend to pack uniformly, resulting in water channeling through the bead bed that greatly reduces filtering effectiveness.

Recently, the industry has turned to hollow plastic tubular media. Hollow plastic tubular media have several advantages over bead media. First, they eliminate water channeling through the media bed due to the random orientation of individual units. Second, water travels on the surface of the tubular media as well as through the hollow inner space of the media. Better circulation means more oxygen for bacterial growth. Third, the ribbed outer surface of tubular media preserves the bacterial bio-film, and the intricate configuration of the inner surface adds even more opportunity for biological activities. Fourth, the ribbed outer surface creates a tighter interstitial spacing between adjacent media and interlocking media surfaces result in better entrapment of solids. Finally, if the density of the plastic material used is the same as that of water, and the media are neutral in buoyancy, the tubular media will settle against the water flow (upward or downward) forming a dense packing within the tank. In the backwash mode, hollow plastic tubular media are easy to unpack. By reversing the water flow, without the use of an air blower, the media bed can be fluidized, trapped solids unclogged and the dirty water is directed to the waste line. Cleaning of the filter is accomplished by backwashing the filter, when the media is stirred and the dirt is flushed out with internal water jets.

Current tubular media have overcome problems with water channeling, and with removal of bacteria during the backwash cycle. However, current systems using hollow plastic tubular media continue to have a number of additional deficiencies:

First, current systems continue to use components of a sand filter which have the diffuser column consisting of a number of lateral slot that have openings that are small, thus preventing the sand from passing through. This results in rapid clogging when the diffuser is used as a pond filter.

Second, the strainer does not have sufficient openings to allow the dirt to be removed from the filter bed quickly. Consequently, current systems consume a significant amount of water in backwashing the media bed. Furthermore, the openings in current systems are small circles, and this has the unfortunate effect of creating a water jet that stirs up the biological media at the top of the tank.

Third, a first diffuser head (with multiple lateral slots) is located at the bottom of the filter tank and a second diffuser head (generating spiral water jets) is located at the middle of the diffuser column. During backwash, the water is divided into two portions. One provides water to the laterals located at the bottom of the filter tank, lifting the media bed and dislodging dirt and debris from the media bed. At the same time, the combination of the second diffuser's water jets with the lateral jets at the bottom will stir the media bed in an upward spiral motion. This movement of the media bed further dislodges dirt and debris trapped within the media bed and directs the dirt and debris to the waste line through the multiport valve. This diffuser column configuration has several disadvantages. Since the water is divided into two portions, the water that exits at the second diffuser head may not provide sufficient pressure in order to effectively stir and agitate the entire media bed. Also, the water that exits through the lateral slots at the bottom of the filter tank will not have enough water flow volume to rapidly dislodge dirt within the lower portion the media bed. Thus it will take more water to clean the entire media bed, resulting in energy inefficiency.

Fourth, the bio media is made of ABS plastic, a sinking type of bio media which requires more energy to clean, and is not made to be used for retrofitting of any bead systems on the market.

SUMMARY OF THE INVENTION

The main objective of this invention is to provide pondkeepers with a system that provides good water quality with better mechanical and biological filtration, longer periods of time between cleanings, more efficient cleaning of the biological filtration media, and visual indication of when cleaning is needed.

It is also an object of the invention to save water and energy during the cleaning cycle.

The invention provides an improved apparatus for filtering and cleaning water of a pond or body of water. A system using the invention is comprised of a general cylindrical container having an inlet through which water is received from the pond with waste material entrained therein. The container includes an outlet through which filtered water is returned to the pond and a waste outlet through which backwashed water and waste material can be removed from the filter container. Biological filtration media contained within the general cylindrical container occupy approximately 85 percent of the container's volume so that the top surface of the biological filtration media bed resides at the top end of the filter container.

The water with waste material is introduced to the general cylindrical container from the pond wherein the outlet of the filter container receives water from the bottom end of the biological filtration media after water has traveled through the biological filtration media bed so that waste material from the water is retained by the biological filtration media thereby producing filtered water. A diffusion apparatus positioned in the center of the general cylindrical container is embedded within the biological filtration media, and introduces water jets tangentially and partially at angles of elevation and declination from the horizontal into the container so as to form a vertical flow to urge the biological filtration media and the waste material entrained therein towards the top of the filter container to thereby permit removal of the waste material from the filter container. The vertical flow of the biological filtration media and the waste material facilitates separation of the biological filtration media from the waste material to further facilitate removal of the waste material.

The invention uses a common tank and multi-port valve configuration (top mounted or side mounted), but improves the design of conventional filters in five significant ways:

First, the biological filter material is an improved hollow plastic tubular type. It is designed to give the maximum surface area for bacteria colonization, as well as a tighter packing density for better entrapment of dirt, debris, and organic materials. This design eliminates the problem of water channeling through the media bed, is neutrally buoyant for fast and effective cleaning of the media, and yet still protects the bacterial bio-film during the backwash cycle.

Second, the invention uses a new diffuser column design that provides a very low or negligible restriction of the water flow, thereby more effectively cleaning and removing trapped dirt, debris, and organic materials.

Third, the invention uses a new strainer design that does not restrict the water flow, yet keeps large debris like leaves and plants from entering the filter and prevents the biological filtration media from escaping from the filter tank.

Fourth, during backwash mode in the cleaning cycle, the quick drain assembly provides a secondary drain passage in addition to the exit passage through the multi-port valve. The quick drain valve can be opened to provide a faster release to the waste line of trapped dirt, debris, and organic materials within the biological filtration media bed. This is an energy savings feature, as the faster trapped dirt, debris, and organic materials are removed from the filtration system the less energy the system consumes.

Finally, the filter tank is provided with a see-thru feature. The tank is made of either a plastic material or fiberglass. The filter tank can be made entirely with a transparent plastic material, or it can be made with opaque plastic material with transparent plastic window(s). If fiberglass is used, the filter tank is made of fiberglass with a transparent plastic material for the window(s). The window(s) can be screwed on the filter tank, riveted on, glued on, laminated, or cast in depending on the manufacturing process that is available from the plastic industry. The purpose of a see-thru filter tank is to have a visual inspection of the biological filter media bed. This serves two purposes. One, it alerts the pond owner when cleaning is needed. Two, it provides visual feedback that ensures cleaning is complete. As far as we are aware, there are currently no systems on the market that allow this "user friendly"visual inspection of a filtration system.

An aspect of the invention, as applied to a pond filtering and cleaning apparatus having a filter tank, a multi-port valve, a strainer, a diffuser head, and biological filter media, is an improvement providing hollow tubular biological filter media having outside longitudinal ridges and internal free-standing fins, and a diffuser head having an outside wall slotted vertically, the slots being spaced evenly around the circumference of the diffuser and extending slightly into a tapered upper surface of the diffuser head, wherein a slot width, a slot length and number of slots are adjusted to give sufficient water pressure for an upward spiral movement during a backwash mode and unrestricted water flow during a filtering mode.

In a further aspect of the invention the improvement provides a strainer having a conical bottom portion with evenly spaced radial slots, a slot width and number of slots being adjusted to capture debris in filtering mode, prevent escape of biological filter media during backwash mode, and provide unrestricted water flow. The improvement also provides a filter tank being constructed with transparent material so as to permit visual inspection of the biological filter media, and a quick drain assembly having a vertical pipe with openings large enough to provide water flow for rapid removal of debris within the tank yet small enough to exclude the biological filter media.

BRIEF DESCRIPTION OF THE DRAWINGS

The foregoing and other objects, aspects and advantages will be better understood from the following detailed description of a preferred embodiment of the invention with reference to the drawings, in which:

FIGS. 12A and 12B are cross section and perspective views, respectively, showing Variation 1 of the biological filter media.

DETAILED DESCRIPTION OF A PREFERRED EMBODIMENT OF THE INVENTION

Figure 1:
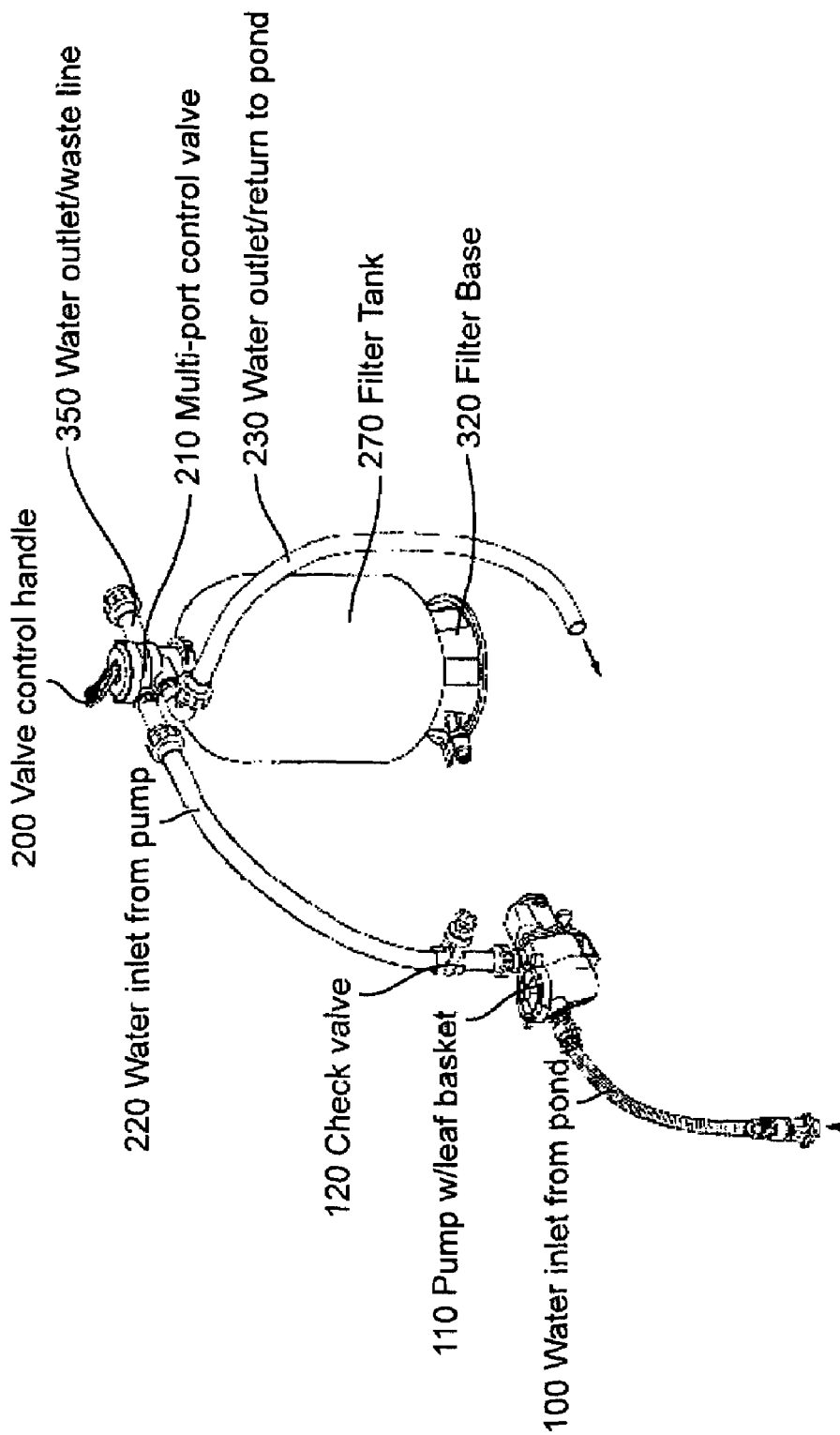
FIG. 1 is an overview of the system setup includes pump and plumbing.

Referring now to the drawings, and more particularly to FIG. 1, there is shown an overview of a pond water filtration system. Water comes into the system from the pond through a water inlet 100, pulled by a pump 110 having a leaf basket for removing leaves. A check valve 120 prevents backflow from the filtration system. Water inlet 220 channels the pond water into the filter tank 270 via a multi-port control valve 210 controlled by valve control handle 200. The filter tank is mounted on a filter base 320. Filtered water is returned to the pond through water outlet 230. Waste is discharged through water outlet 350.

The purpose of this invention is to provide pond owners with an improved new water filtering system that is simple and easy to use, gives a maximum mechanical and biological filtration with significantly improved biological filter material, uses a see thru filter tank for monitoring the need for cleaning of the biological filtration material, has a new design of the diffuser column to enable the system to be self-cleaning (i.e. without using an air blower, or compressed air), and uses an energy saving quick drain assembly that gives this new filter system a higher energy efficiency than any other system on the market today.

Figure 2:
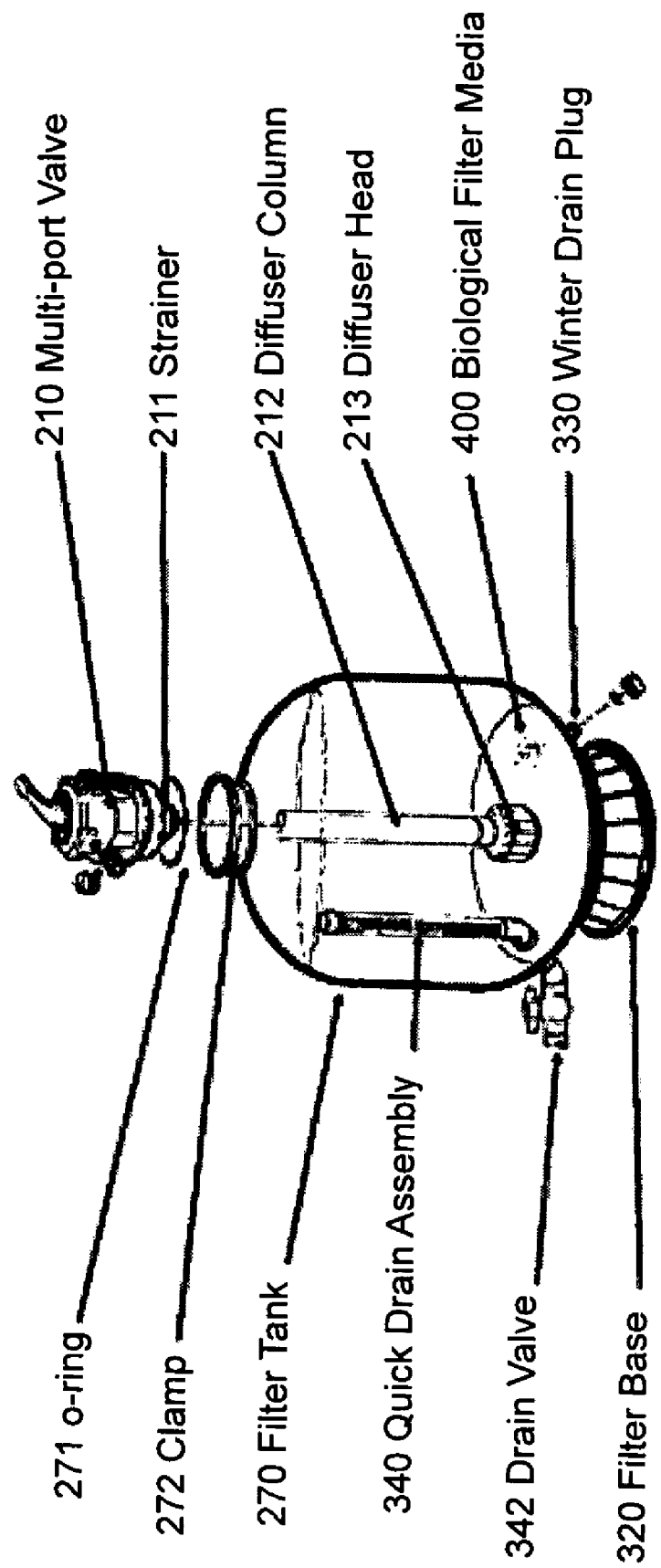
FIG. 2 is an exploded view of a top mounted filter with all components.
Figure 3:
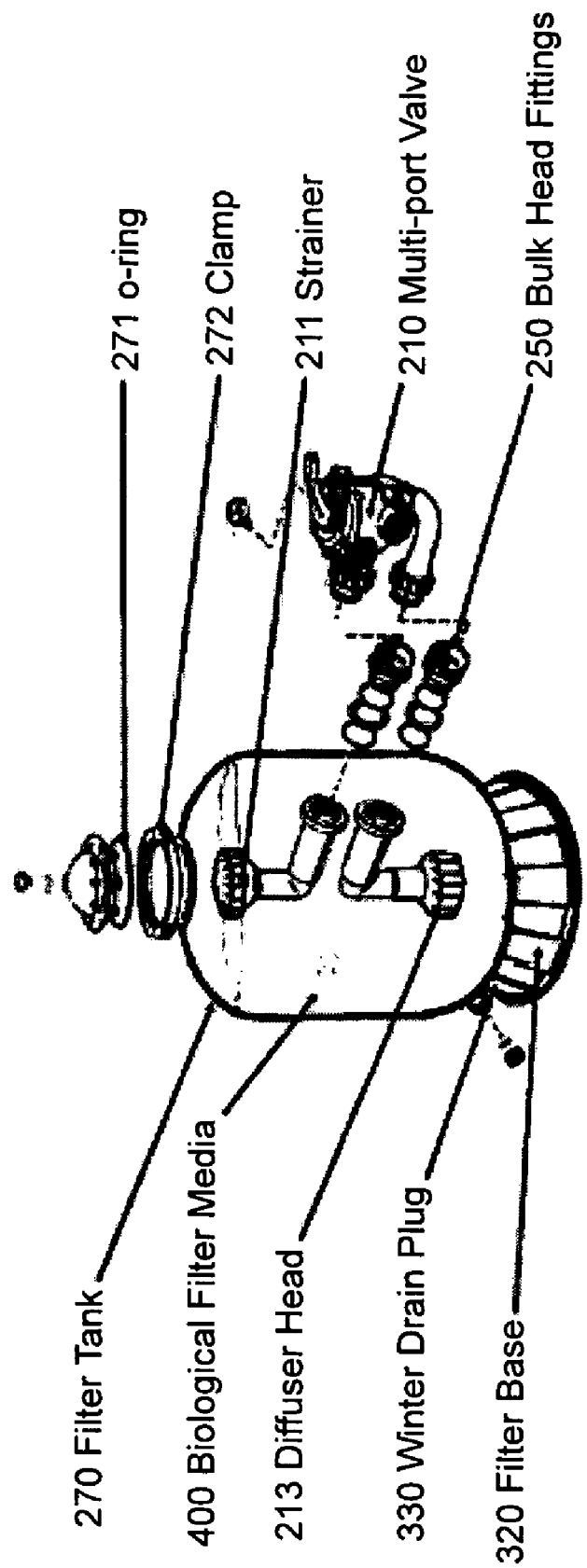
FIG. 3 is an exploded view of a side mounted filter with all components.

The five (5) main system component improvements contained in my invention may be understood with reference to FIGS. 2 and 3. First is the biological filter material 400, second is the diffuser column 212, third is the strainer 211, fourth is the quick drain assembly 340, and last is the filter tank 270.

As shown in the top mounted system of FIG. 2, the multi-port valve 210 and strainer 211 are mounted on the filter tank 270 using an o-ring 271 and clamp 272. A diffuser head 213 is at the bottom of the diffuser column 212. A winter drain plug 330 is provided at the base of the filter tank 270. A drain valve 342 is provided to open and close the quick drain assembly 340.

As shown in the side mounted system of FIG. 3, the filter tank 270 is capped using an o-ring 271 and clamp 272. A strainer 211 and diffuser head 213 are connected to the multi-port valve 210 via bulk head fittings 250. A winter drain plug 330 is provided at the base of the filter tank 270.

Description of Component 1: Biological Filter Media

The improved biological filter media of the invention is made of a plastic material which is neutral buoyant in water (high impact polystyrene, or high molecular weight polethylene) and is a hollow plastic tubular type with ridges on the outer surface and free-standing fins on the inner surface that provide a high surface area-to-volume ratio and thus can support a high volumetric density of naturally occurring heterotrophic bacteria. The heterotrophic bacteria colonize on the external and internal surfaces of the biological filtration media and metabolize waste and organic materials trapped by the media. This biological filtration process reduces the need for chemical treatment and maintains a level of water quality that sustains healthy aquatic-life forms. The media dimensions should be limited in diameter (approximately 0.250 inches and length (approximately 0.375 inches) so that they are not so large that the overall surface area is not reduced below a certain minimum, and also are not so small that there is clogging within media cavities and consequent restriction of the water flow. Experimental results indicate that a range of 0.23 to 0.29 inches in diameter is optimal for a best mode of implementation, and that a range of 0.370 to 0.380 inches in length is optimal for a best mode of implementation.

The tubular design of the invention features small ridges on the outer wall. It is advantageous to have a large number of ridges on the outer wall, with tips relatively small in comparison to the valleys between the ridges, in order to provide maximum surface area for bacterial agents, but shallow valleys to avoid interlocking of media during backwash. It also provides fin-like structures on the inside wall running the entire length of the media that point towards the center of the tube. This fin-like design provides tremendous area for bacterial growth and colonization and the hollow inner space allows more entrapment of pond dirt, sediment and organic materials.

Figure 4B:
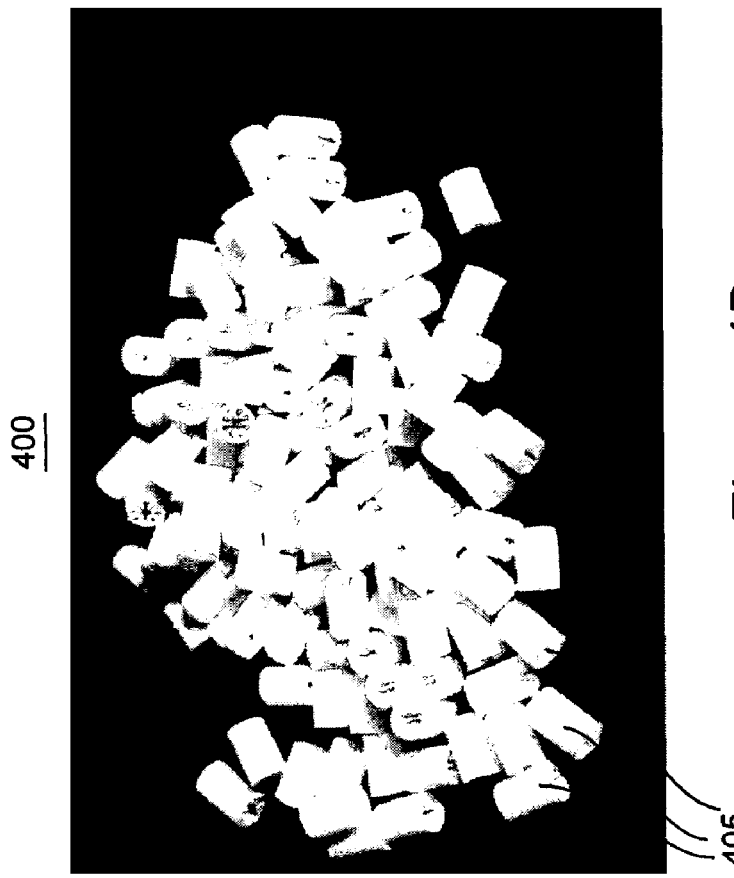
FIG. 4 is an overview of the biological filter media 3-D view, with a cross section view.
Figure 4A:
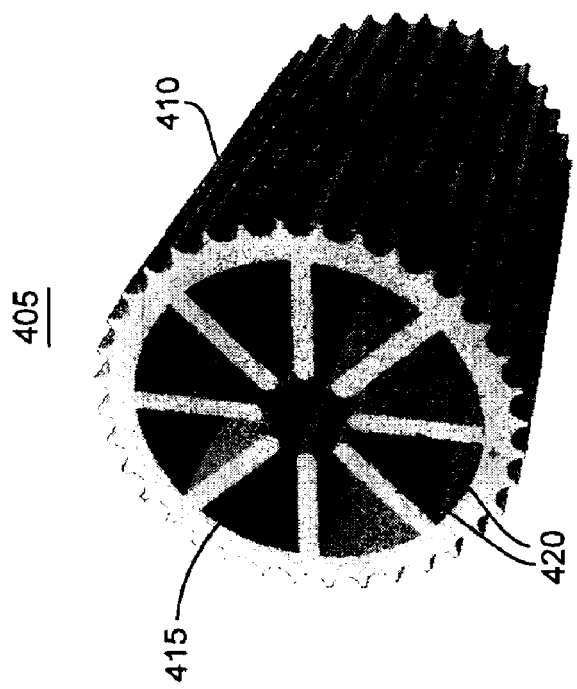

The biological filtration media 400, as shown in FIGS. 4A and 4B, have a smaller diameter as compared to their length. In this best mode embodiment there are thirty-six ridges and eight fin-like structures. This design prevents channeling through the media bed because it allows random orientation of the media packing and directs the flow of water through the media bed 400 on the ridged outside surface 410 of a single tube 405 as well as through the hollow inner space 415 with the fin-like structures 420. The ridges 410 and fin-like structures 420 extend longitudinally along the outer and inner surfaces, respectively, of the hollow cylindrical tube, parallel to the center axis of the cylindrical tube. The fin-like structures 420 are free-standing fins, that is, fins protruding inward from the inner surface of the hollow tube and terminating at a distance from the center axis of the tube. This design provides sufficient oxygen to the beneficial bacteria colonizing on these surfaces. The ridges 410 running longitudinally along the outer wall of the media serve two purposes. One, the ridges 410 prevent unwanted "sticking" between adjacent media and provide a tighter space between the media for a better entrapment of solid material. Two, the ridges 410 protect the bacterial bio-film during backwashing.

Description of Component 2: Diffuser Column

Figure 5C:
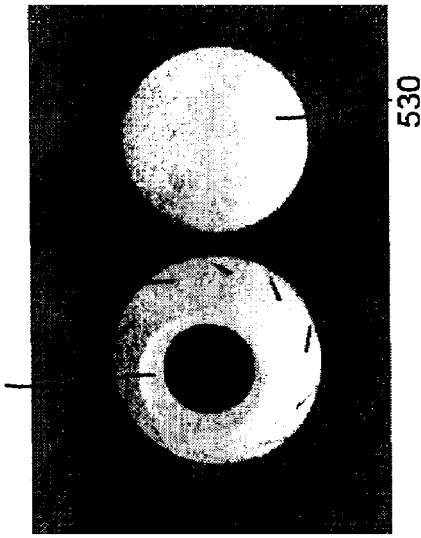
FIGS. 5B and 5C are views of the diffuser head from the bottom and top, respectively.
Figure 5B:
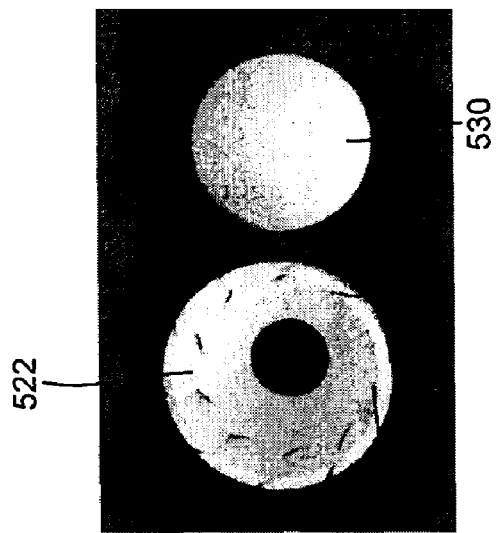
Figure 5A:
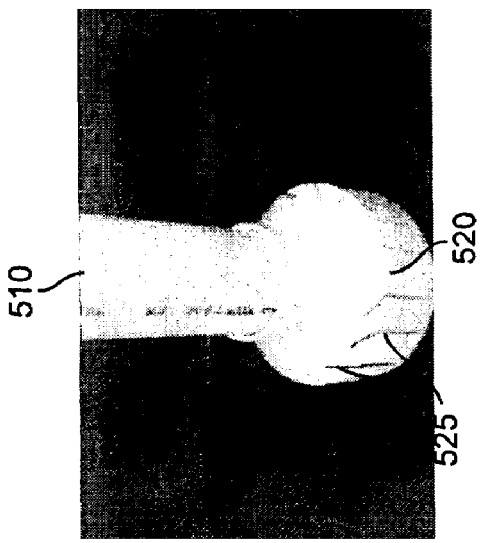
FIG. 5A is a perspective view of the diffuser column.

The diffuser column 212 as improved in accordance with the invention may be understood with reference to FIGS. 5A, 5B and 5C. The diffuser column is a non-rotating column consisting of a straight pipe 510 (approximately 1.5 to 2.0 inches in diameter) with one end attached to the strainer (not shown) and the other end connected to a diffuser head 520 extending to the bottom of the filter tank. FIG. 5B shows the inside 522 of the diffuser head 520. FIG. 5C shows the outside of the diffuser head 520 before attachment to the diffuser column 510. The length of the diffuser column depends upon the height of the filter tank and the distance from the strainer where it is attached to the bottom of the filter tank. The diffuser head is a simple, short tube that is of a larger diameter (approximately 4 to 5 inches in diameter for a 1.5 inch diffusion column, and 5 to 6 inches in diameter for a 2.0 inch diffusion column) than that of the diffuser column.

The upside of the diffuser head is tapered and the underside is capped with a flat disc 530. The outside wall of the diffuser head itself is slotted vertically with several approximately ⅛ of an inch wide slots 525. The slots 525 are distributed evenly around the circumference of the diffuser head body 520 and extend slightly into the tapered upper surface of the diffuser. The slots 525 are cut at an angle (e.g. 20 to 45 degrees) to a tangent at the curvature of the cylindrical portion of the diffuser inner wall 522.

There is an important rationale for these slotted cuts 525, namely, that during backwashing in the cleaning mode the water exiting from these slots creates a spray pattern that is planar, pointing outward and tangential to the diffuser. These jets create a rapid, spiral and upward movement of the body of the water in the filter tank. The biological filter media will move along with the water body in a cyclonic, upward motion resulting in unpacking of the biological filter media. The dirt, debris and organic matter trapped within the biological filter media bed are now released with this upward flow as the water exits the filter at the top. In the filtering mode, these slots act as a strainer retaining the biological filter media within the filter tank.

The width, the length as well as number of slots are adjusted so that they give sufficient pressure to the water jet for cyclonic, upward movement of the media bed and still provide unrestricted flow in the filtering mode. In the best mode of implementation of the invention for a typical installation, based on adjustments measured according to these criteria, a diffuser head having ten slots of a particular width and length provided performance superior to diffuser heads of the same size having eight slots or sixteen slots.

Description of Component 3: The Strainer

Figure 6C:
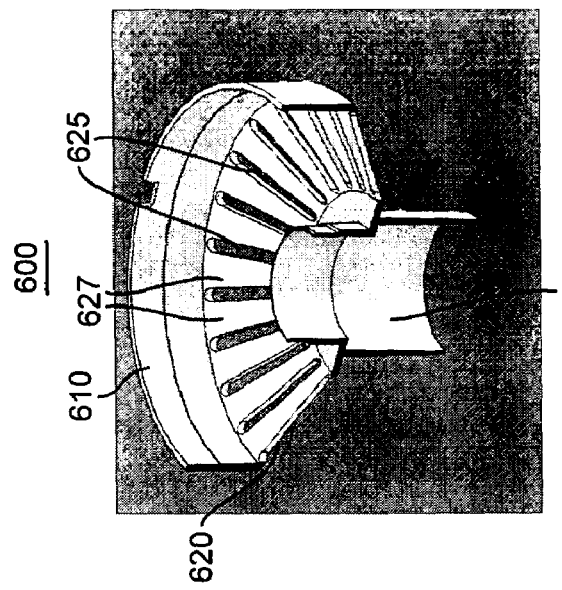
FIGS. 6A, 6B and 6C are top view, bottom view and cut-away views, respectively, of a strainer for a top mounted filter tank.
Figure 6B:
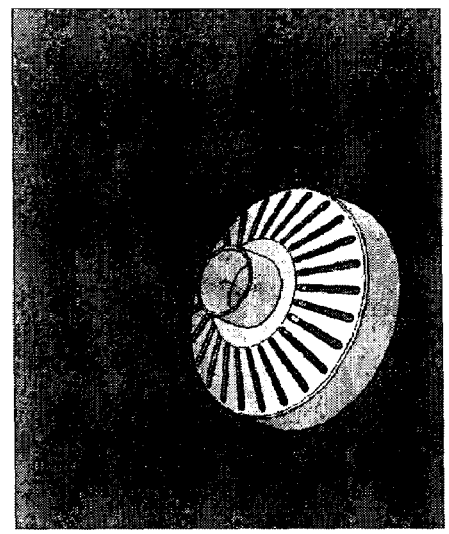
Figure 6A:

In a top mounted filter tank, the strainer 600 has a cylindrical design with a conical bottom, as shown in perspective views from the underside (FIG. 6A) and the top (FIG. 6B), and a cutaway view (FIG. 6C). The embodiment shown in these views also shows a cylindrical top 610 where the upper opening of the strainer is mounted to a multi-port valve (not shown) and a cylindrical fitting 630 (a tube about two inches in diameter and about two inches long) for connecting the strainer 600 to the diffuser column (not shown). The conical bottom 620 of the strainer 600 is slotted with radial openings 625. These radial slots are evenly spaced throughout the conical surface of the strainer with a length extending from the apex to the base of the conical area. The slotted nature of these openings avoids the water jet effect of current systems. With the slotted opening, the water is more evenly disbursed through the opening, without creating a water jet that agitates the filter media at the top of the tank. The width of the slot openings as well as the number of these slots are adjusted so that the strainer captures and prevents large debris from entering the filter during the filtering mode, prevents the biological filter media from escaping the filter during the backwash cleaning mode, and yet still provides unrestricted or nearly unrestricted water flow. The width and number of slot openings also provides adequate strength of the ribs 627 separating the slots. In a typical configuration, there are approximately 24 slots each having a width of less than ¼ of an inch.

Figure 7:
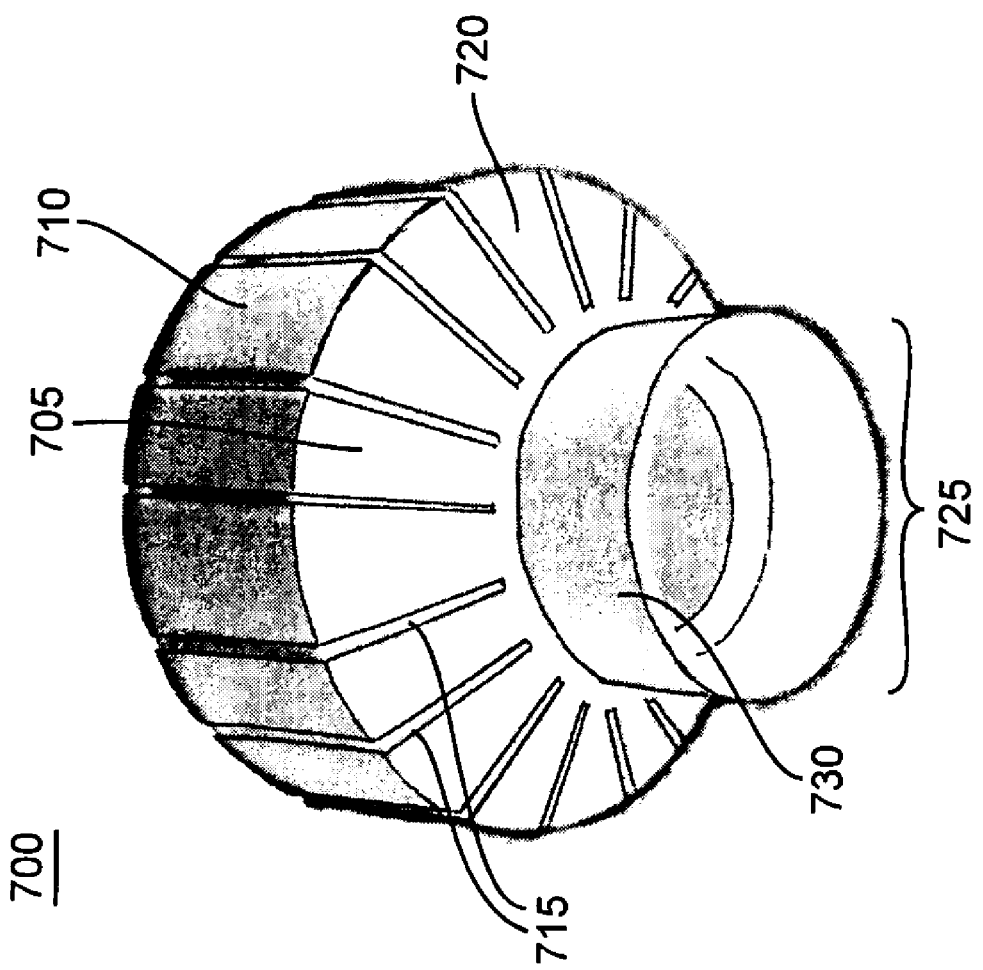
FIG. 7 is an overview of a strainer for a side mounted filter tank.

In a side mounted filter tank, the strainer is a slotted short tube, as shown in FIG. 7. The upside of the strainer 700 is a circular cap 705 covering cylindrical portion 710. Vertical slots 715 in the cylindrical portion 710 extend radially into the cap 705 from the edge to the center, leaving a small unslotted circular area of approximately 2 inches in diameter at the center of the cap 705. The downside of the strainer has a conical bottom 720, and the vertical slots 715 also extend radially into the conical bottom to the cone's apex at a distance of about one inch from the center axis of the conical portion 720, where the strainer 700 is connected at the opening 725 at the apex of the cone to a two inch diameter pipe 730.

Description of Component 4: The Quick Drain Assembly

Figure 8:
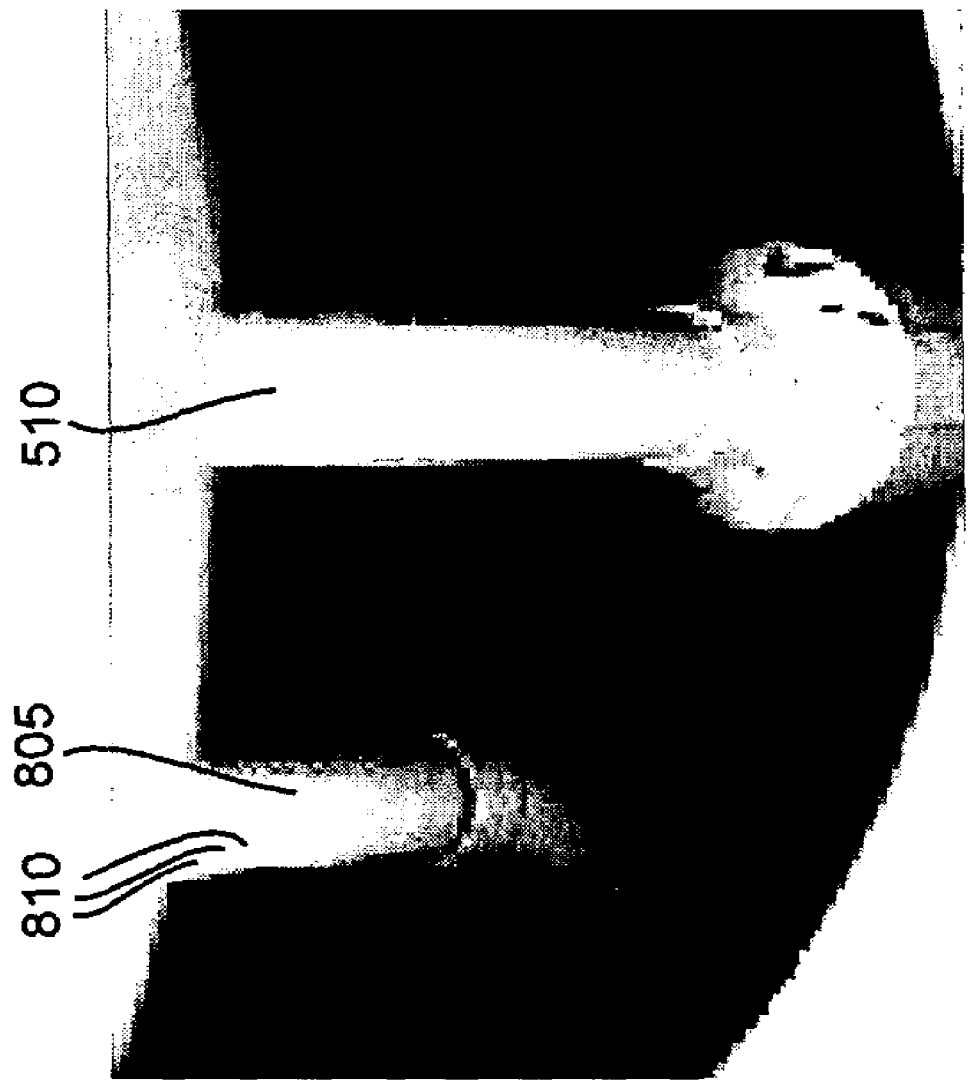
FIG. 8 is a picture from inside the tank of the quick drain assembly.

The quick drain assembly 800 (shown in FIG. 9) is installed in larger filter tanks (either top or side mounted filter tanks) as an energy saving feature. Those portions of the quick drain assembly 800 visible from inside the tank are shown in FIG. 8, including a vertical pipe 805, for draining the tank to remove debris quickly, with openings large enough to provide adequate water flow and yet small enough to exclude the biological filter media. FIG. 8 also shows horizontal slots 810. The pipe 805 varies in diameter (approximately one and one-half to two inches) depending on the size of the filter tank. The function of the slots in the vertical pipe can be served as well by vertical slots, helical slots, round holes, or any suitable pattern of openings that can be accommodated by the vertical pipe. The quick drain is installed vertically near the bottom to near the top of the inside of the filter tank chamber. The top end of the pipe 805 is capped off and the bottom end of the pipe is extended through the filter tank wall to the outside where it is connected to a drain valve 820 (shown in FIG. 9). The purpose of the quick drain assembly 800 is to provide rapid flushing of the trapped dirt and debris from the biological filtration media bed to the waste line during the backwash cleaning mode. The faster dirt and debris are released from the biological filtration media bed, the less water and energy will be consumed.

Description of Component 5: The Filter Tank

Figure 9:
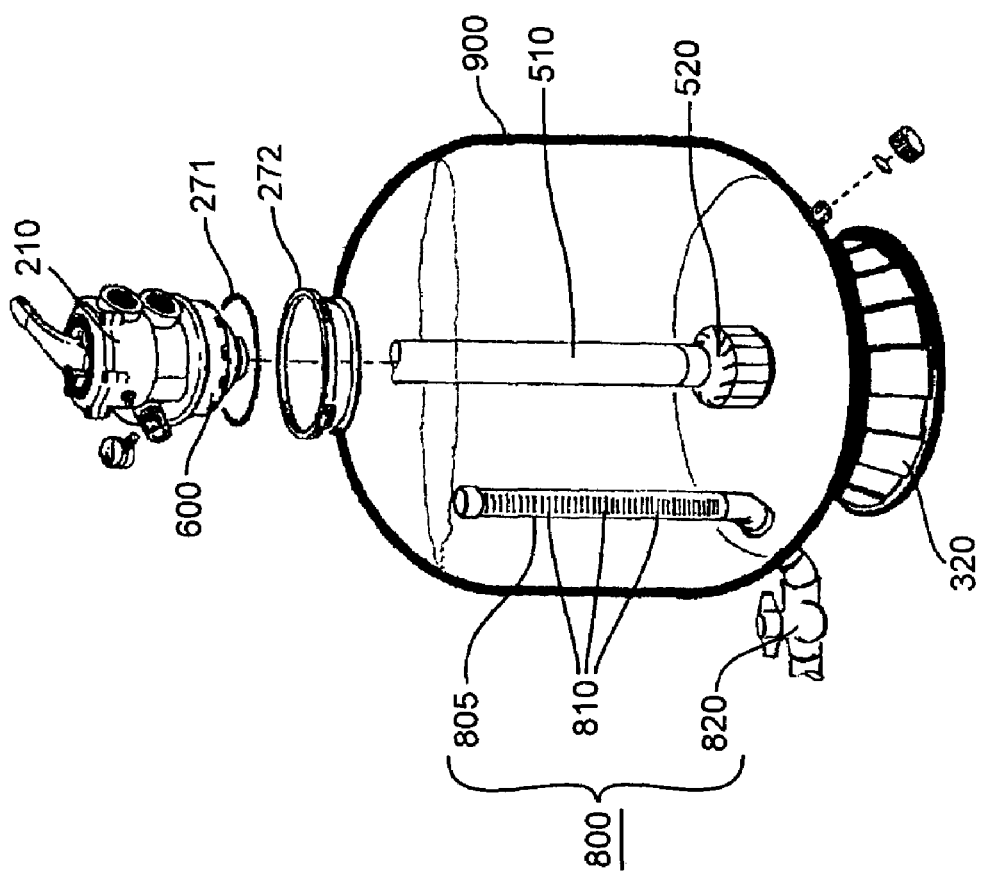
FIG. 9 is an overview of the top mount filter tank, also showing the quick drain assembly with drain valve.

As shown in FIG. 9, the top mounted filter tank 900 is a cylindrical vessel with rounded ends made either of plastic material or fiberglass. The top of the filter tank has a circular opening (approximately 7 inches in diameter) for access to the internal parts, filling, and removing the biological filtration media. A multi-port valve 210 is attached with an o-ring 271 and clamp 272 at the top via the opening at the top of the filter tank. The bottom of the filter tank is sealed. The filter tank bottom is supported by a circular base 320, made of heavy plastic material. Also shown are improvements in accordance with the invention: top mounted strainer 600, diffuser column (pipe 510 and diffuser head 520), and quick drain assembly 800 (pipe 805, slots 810 and drain valve 820). Not shown in FIG. 9, but among the improvements applicable to the top mounted filter tank is biological filter media 400.

Figure 10:
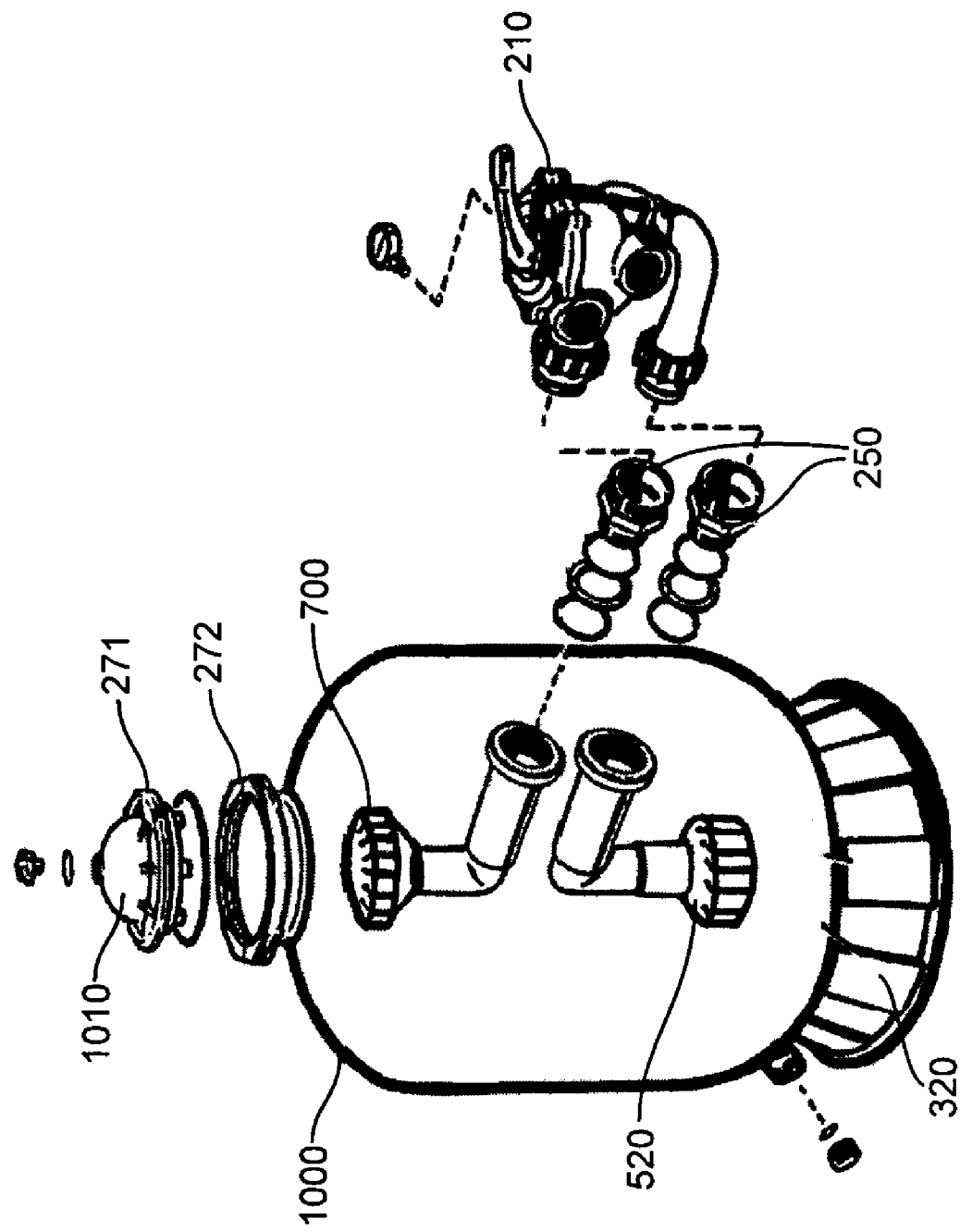
FIG. 10 is an overview of the filter tank—side mount.

As shown in FIG. 10, the side mounted filter tank 1000 is also a cylindrical vessel with rounded ends made either of plastic material or fiberglass. The top of the filter tank has a circular opening (approximately 7 inches in diameter) at the top of the filter tank for access to the internal parts and filling and removal of the biological filtration media, just as with the top mounted tank. The top of the filter tank is sealed with a cap 1010 secured by an o-ring 271 and clamp 272. The multi-port valve 210 is mounted on the side of the filter tank via bulk head fittings 250. The bottom of the filter tank is sealed. The filter tank is supported by a circular base, made of heavy plastic material. Also shown are improvements in accordance with the invention: side mounted strainer 700 and diffuser head 520. Not shown in FIG. 10, but among the improvements applicable to the side mounted filter tank is quick drain assembly 800 and biological filter media 400.

Figure 11B:
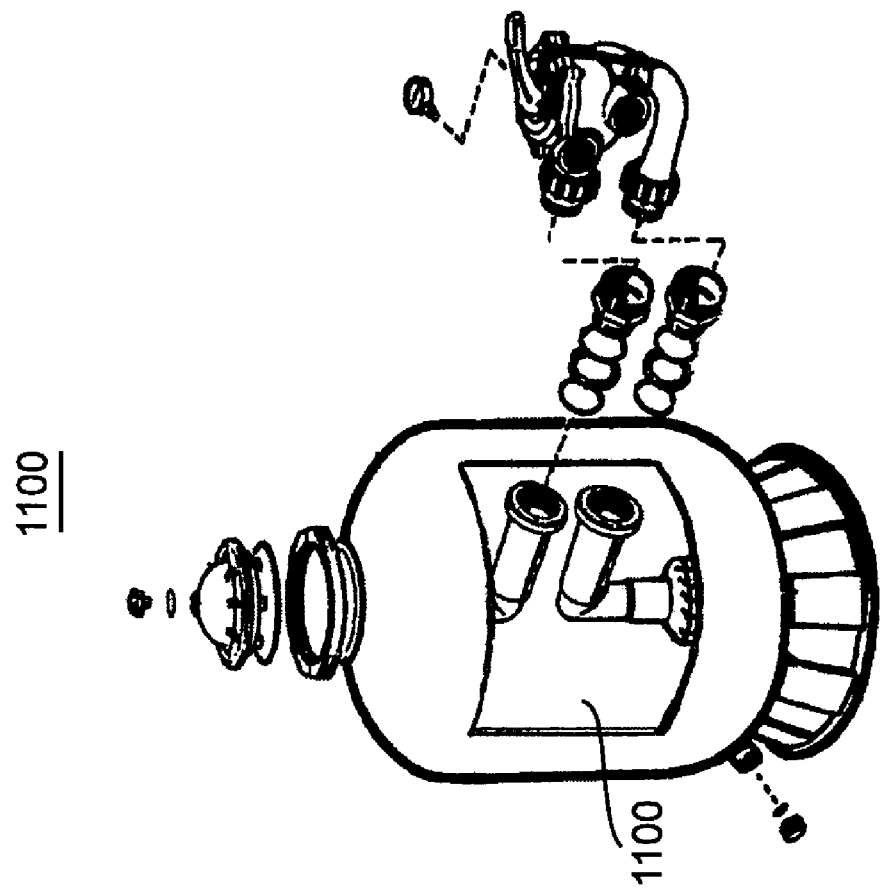
FIGS. 11A and 11B are overviews of top and side mount filter tanks, respectively, showing windows in the filter tank.
Figure 11A:
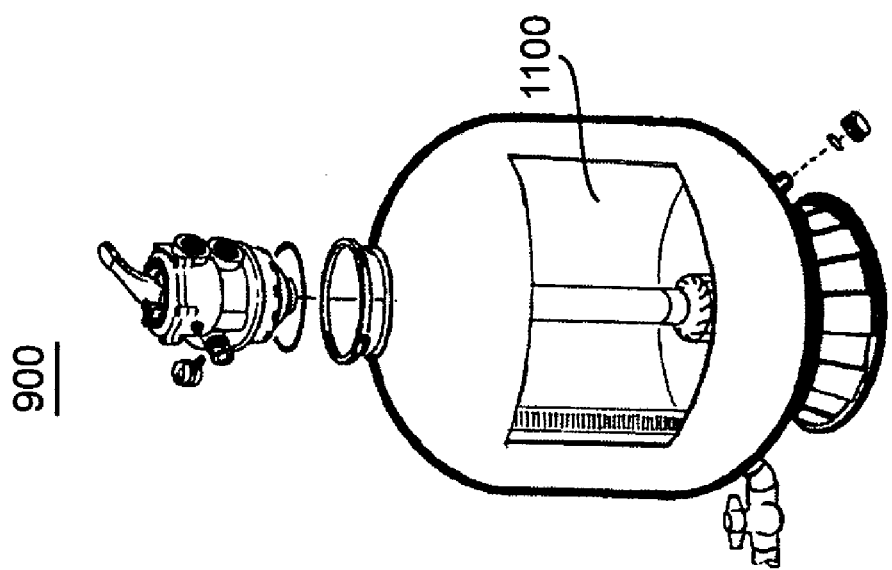

Both of the top mounted and side mounted filter tanks are made of transparent plastic material (or opaque material with transparent window) so that visual inspection of the internal parts, especially the biological filtration media can be made when cleaning is needed is the essential criteria of this invention. The window embodiment of this improvement is shown in FIGS. 11A and 11B by window 1100.

Structural & Functional Variations Description

Possible Structural and Functional Variations of Component 1: Biological Filter Media The structure of the biological filter media described in FIG. 4, with ridges 410 and fins 420, can be varied in a manner consistent with the invention, as shown in the cross sectional and perspective views of FIGS. 12A and 12B, respectively, FIGS. 13A and 13B, respectively, and FIGS. 14A and 14B, respectively.

Variation 1, as shown in FIGS. 12A and 12B: In this alternative embodiment of the invention, the configuration of the outer wall and the fin-like structure of the hollow inner area remains the same. However, the overall diameter of the media can be expanded to ½ inch, with the length of the individual units remaining the same at ⅜ (0.375) of an inch.

Figure 13B:
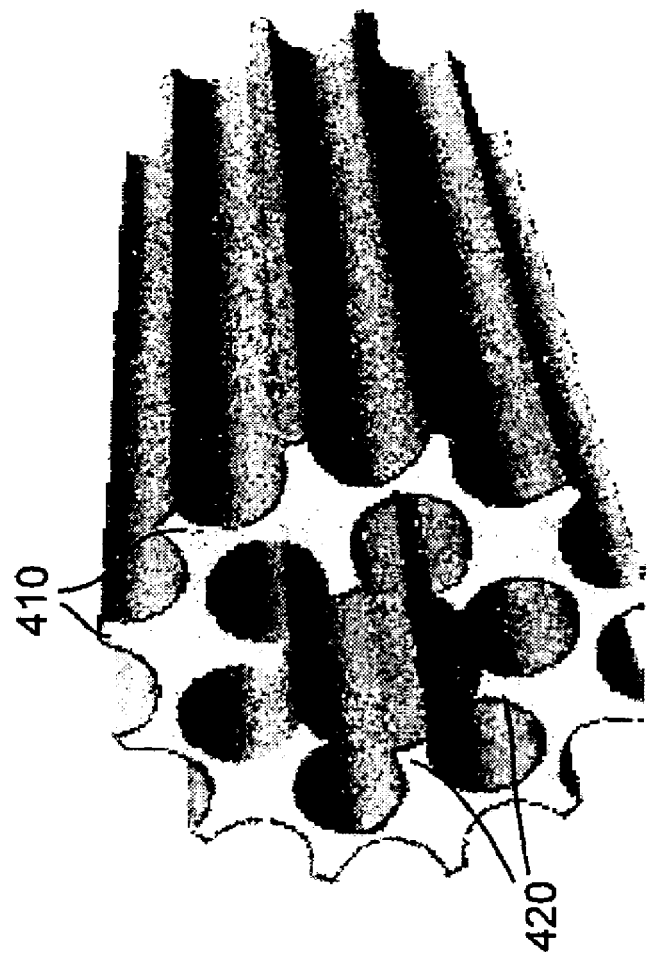
FIGS. 13A and 13B are cross section and perspective views, respectively, showing Variation 2 of the biological filter media.
Figure 13A:
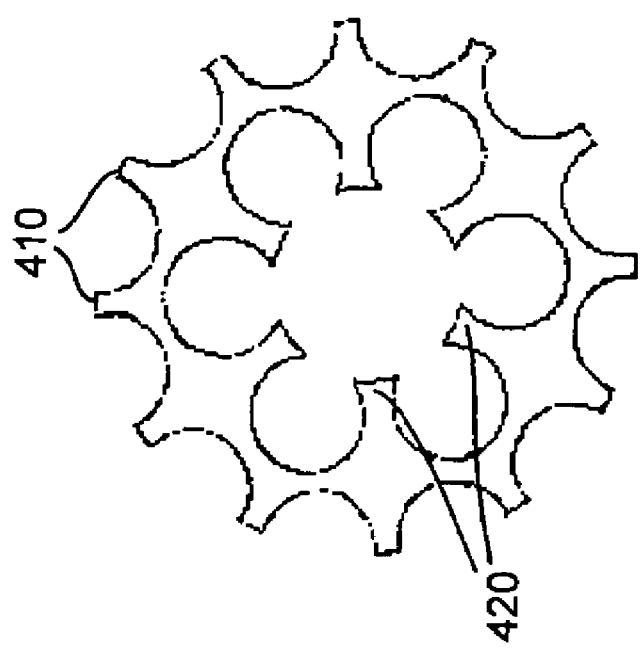
Figure 14B:
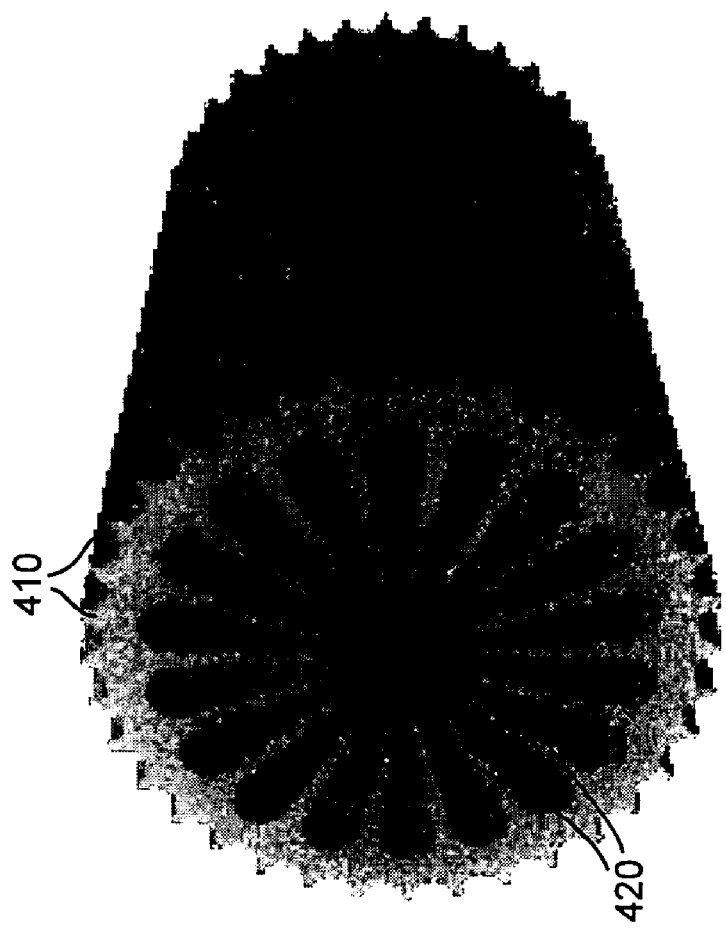
FIGS. 14A and 14B are cross section and perspective views, respectively, showing Variation 3 of the biological filter media.
Figure 14A:
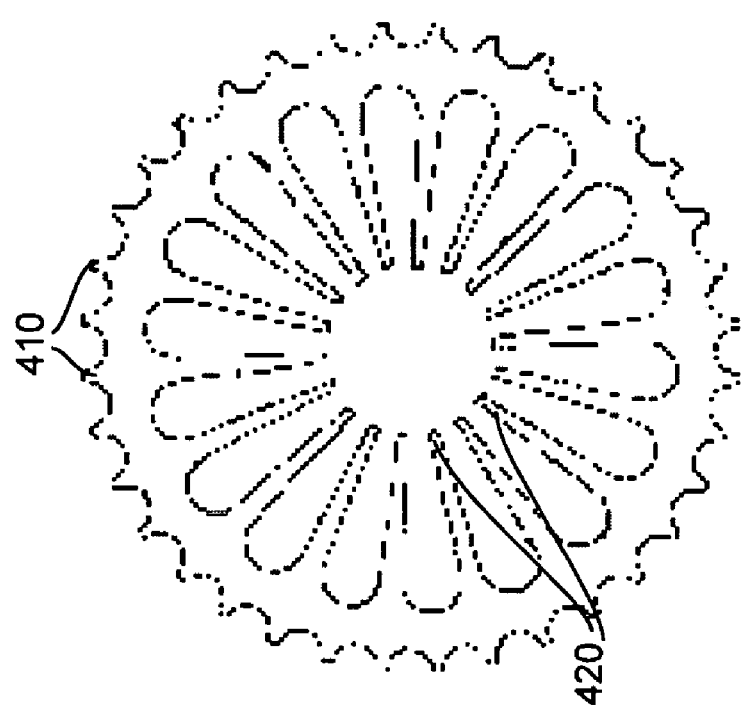

Variation 2, as shown in FIGS. 13A and 13B, and in FIGS. 14A and 14B: In this alternative embodiment of the invention, the configuration of the outer wall remains the same. However, the shape and/or number of the fin-like structure of the hollow inner area can be varied (increased or decreased) depending upon a specific application.

Variation 3, (not shown): The configuration of the ridges in the outer wall can be varied in number and/or shape of the ridges. In addition, depending on a specific application, the density of the plastic material can be either lighter than that of water, for example, polyethylene, a floating media, or heavier than that of water, for example, polyvinyl chloride, a sinking media.

Variation 4, (not shown): The diameter of the media can be expanded from 0.25 inch to 0.50 inch in diameter, with the length of the individual units extended from 0.375 inch to 0.50 inch. These variations will not perform in the best mode, but will still be operable.

Possible Structural and Functional Variations of Component 2: Diffuser Column

Variation 1: In this alternative embodiment of the invention, the diameter of the diffuser column can be expanded from 1.5 inches to 3.0 inches depending upon the required water volume to sustain filter recirculation and backwash requirements of a particular application.

Figure 15B:
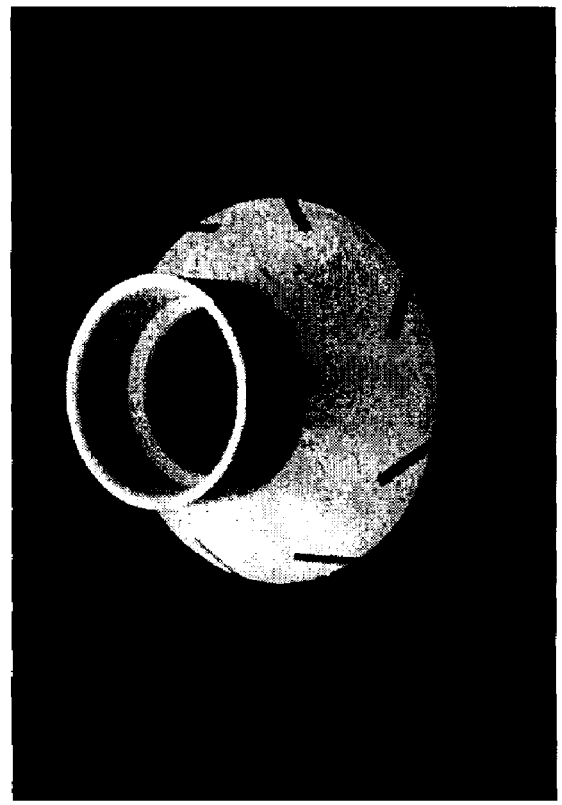
FIGS. 15A and 15B are top and perspective views, respectively, showing Variation 1 of the diffuser head with 8 slots.
Figure 15A:
Figure 16B:
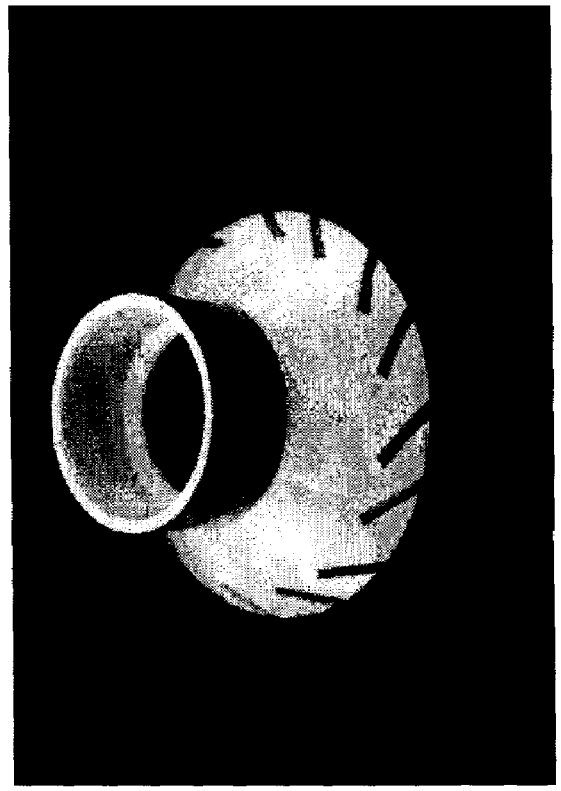
FIGS. 16A and 16B are top and perspective views, respectively, showing Variation 2 of the diffuser head with 16 slots.
Figure 16A:
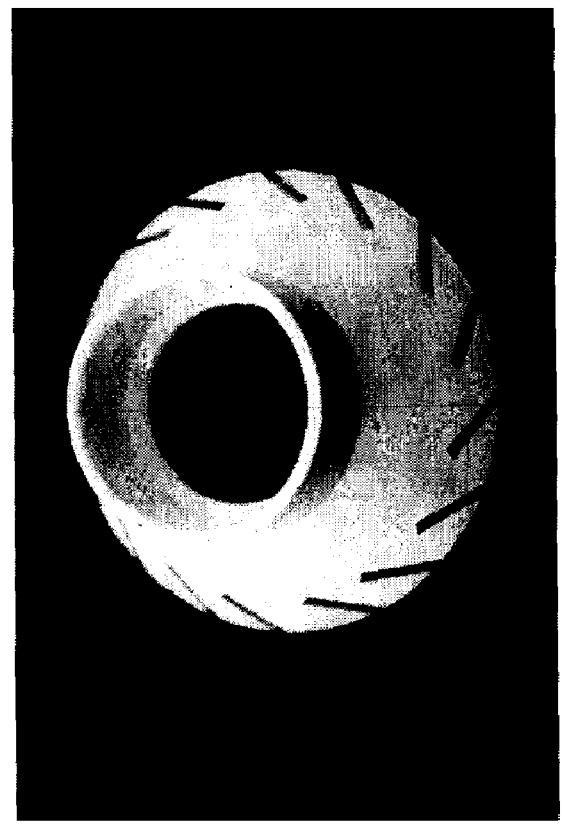

Variation 2: In this alternative embodiment of the invention, the number of slots on the diffuser head can be added or removed to accommodate the water flow produced by the pump and still maintain a sufficient and constant water pressure for agitating the biological filtration media bed during the backwash, or cleaning cycle. FIGS. 15A and 15B show top and perspective views, respectively, of a diffuser with eight slots. FIGS. 16A and 16B show different perspective views of a diffuser with sixteen slots.

Figure 17:
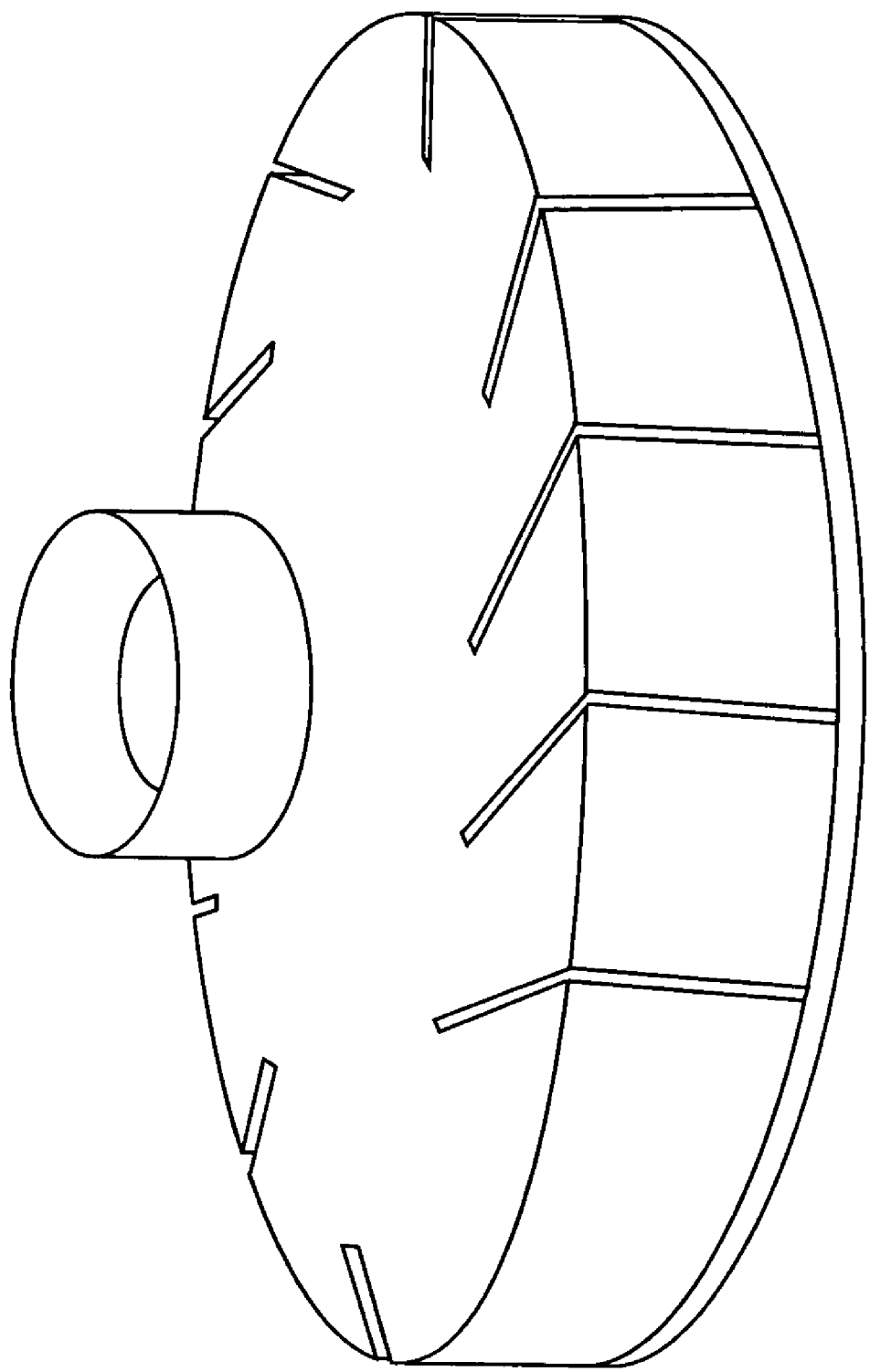
FIG. 17 is a perspective view showing Variation 3 of the diffuser head, with a larger diffuser head.

Variation 3: In this alternative embodiment of the invention, in a larger diameter filter tank, the overall outside diameter of the diffuser head can be increased from 5 inches to approximately 10 inches so that the water jets can reach further out towards the tank walls, as shown in FIG. 17. It is possible to have even larger sizes of diffuser heads for larger tanks, limited by the mechanical task of inserting the diffuser head into the tank. If the top opening is 7 inches, then a diffuser head of 10 inches in diameter can only be mounted in a tank having two sections (as described below). Alternatively, a plurality of smaller diffuser heads can be arranged in a multiple configuration (as described below), by being assembled one at a time.

Figure 18B:
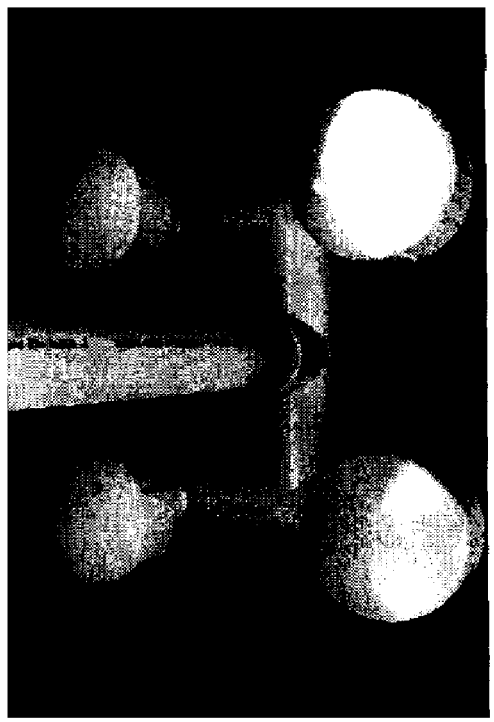
FIGS. 18A and 18B are side and top views, respectively, of a multiple diffuser head configuration.
Figure 18A:
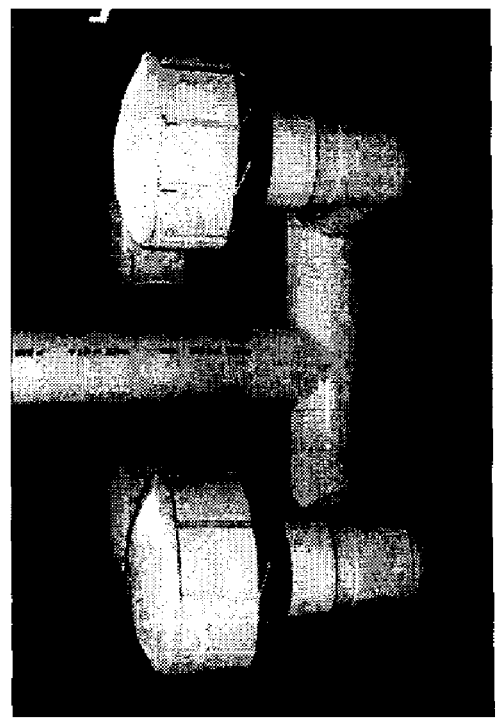

Variation 4: In this alternative embodiment of the invention, in a larger diameter filter tank, multiple diffuser heads can be placed on an array so that the water jets can sufficiently agitate the biological filtration media bed, as shown in FIGS. 18A (side view) and 18B (perspective view).

Possible Structural and Functional Variations of Component 3: The Strainer

Figure 19:
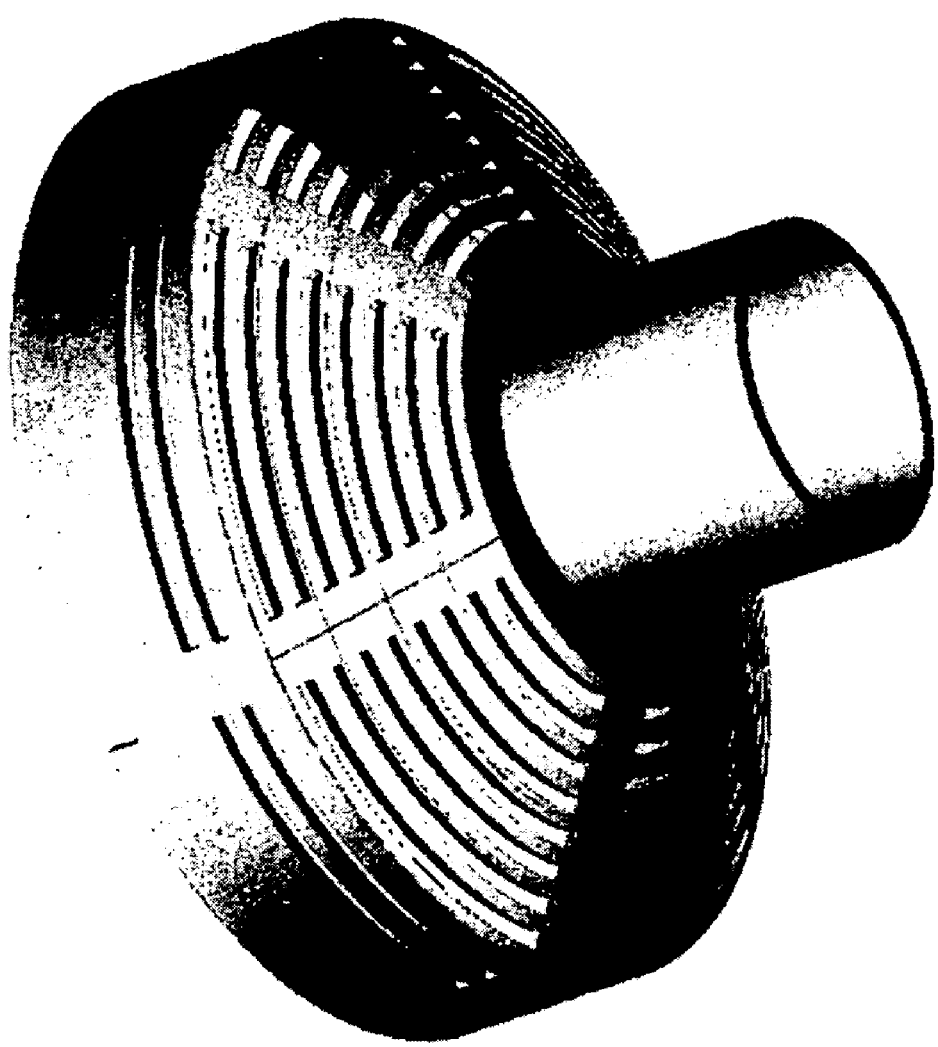
FIG. 19 is a diagram showing Variation 1 of the strainer for a top mounted filter, with horizontal slots.

Variation 1: In this alternative embodiment of the invention, in a top mounted filter design, the slots are horizontal (i.e. in arcs within concentric circles around the center axis of the filter) as shown in FIG. 19.

Figure 20B:
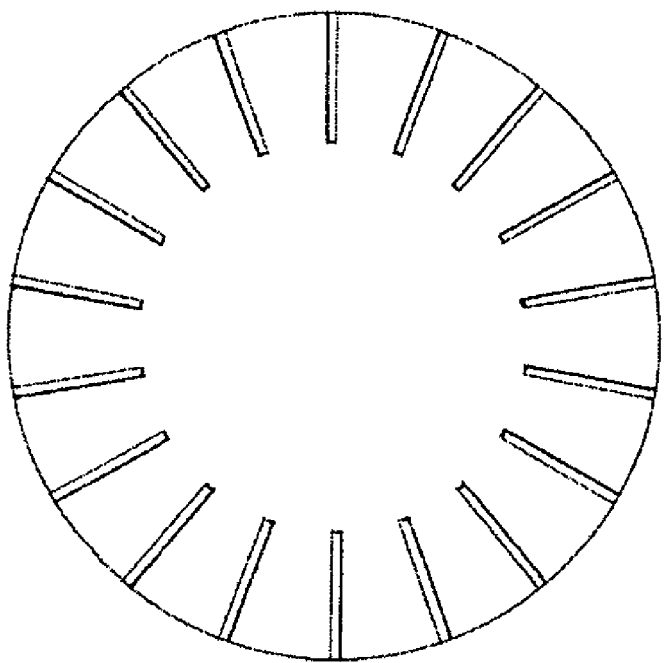
FIGS. 20A and 20B are underside perspective and cross sectional views, respectively, showing Variation 2 of the single strainer for a side mounted filter.
Figure 20A:
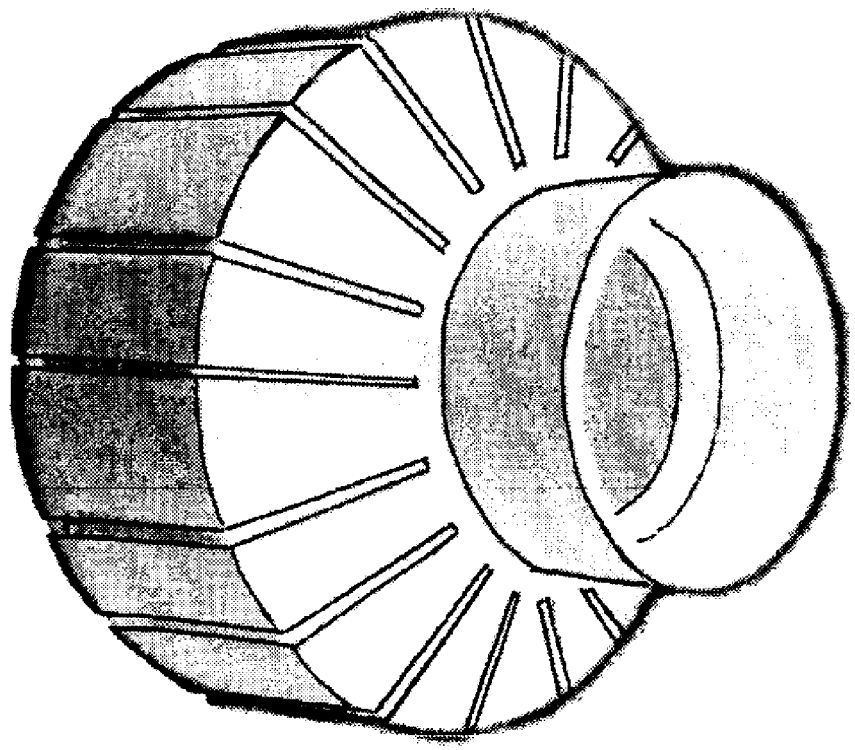

Variation 2: In this alternative embodiment of the invention, in a small side mounted filter tank design, the strainer consists of a single strainer similar to the diffuser head mounted at the bottom of the column, but where the slots are cut radially and mounted in the opposite direction (up side down) as compared to the orientation of the diffuser head at the bottom, as shown in the underside perspective view of FIG. 20A and the cross sectional view of FIG. 20B.

Figure 21:
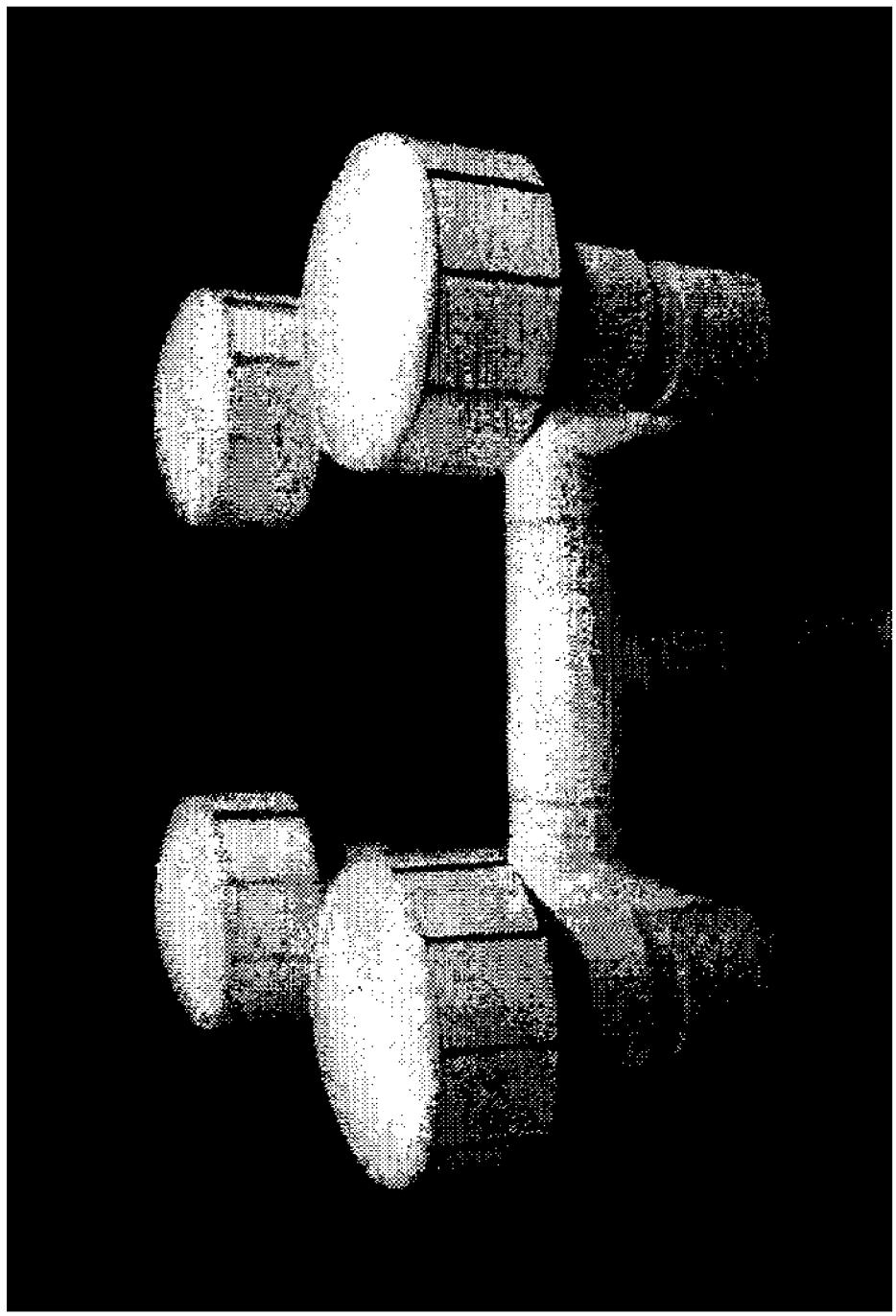
FIG. 21 is a perspective view of a multiple strainer array for a side mounted filter.

Variation 3: In this alternative embodiment of the invention, where there is a larger side mounted filter tank, the strainer consists of an array of multiple diffuser heads radially slotted and mounted in a upside down position close to the top of the filter tank, as shown in FIG. 21.

Possible Structural and Functional Variations of Component 3: The Quick Drain Assembly Variation 1: In this alternative embodiment of the invention, the quick drain assembly is installed only in larger diameter filter tanks where quick evacuation of dirty water is necessary for energy savings. The length of the vertical drain tube is extended from the bottom of the filter chamber to the level of the packed bio media bed inside the tank chamber. Thus for a bigger and taller filter tank, the drain tube is made taller and the diameter of the drain tube varies from a standard 1.5 inch in diameter to 2 inches in diameter in order to maintain the same output.

Possible Structural and Functional Variations of Component 5: The Filter Tank

Figure 22:
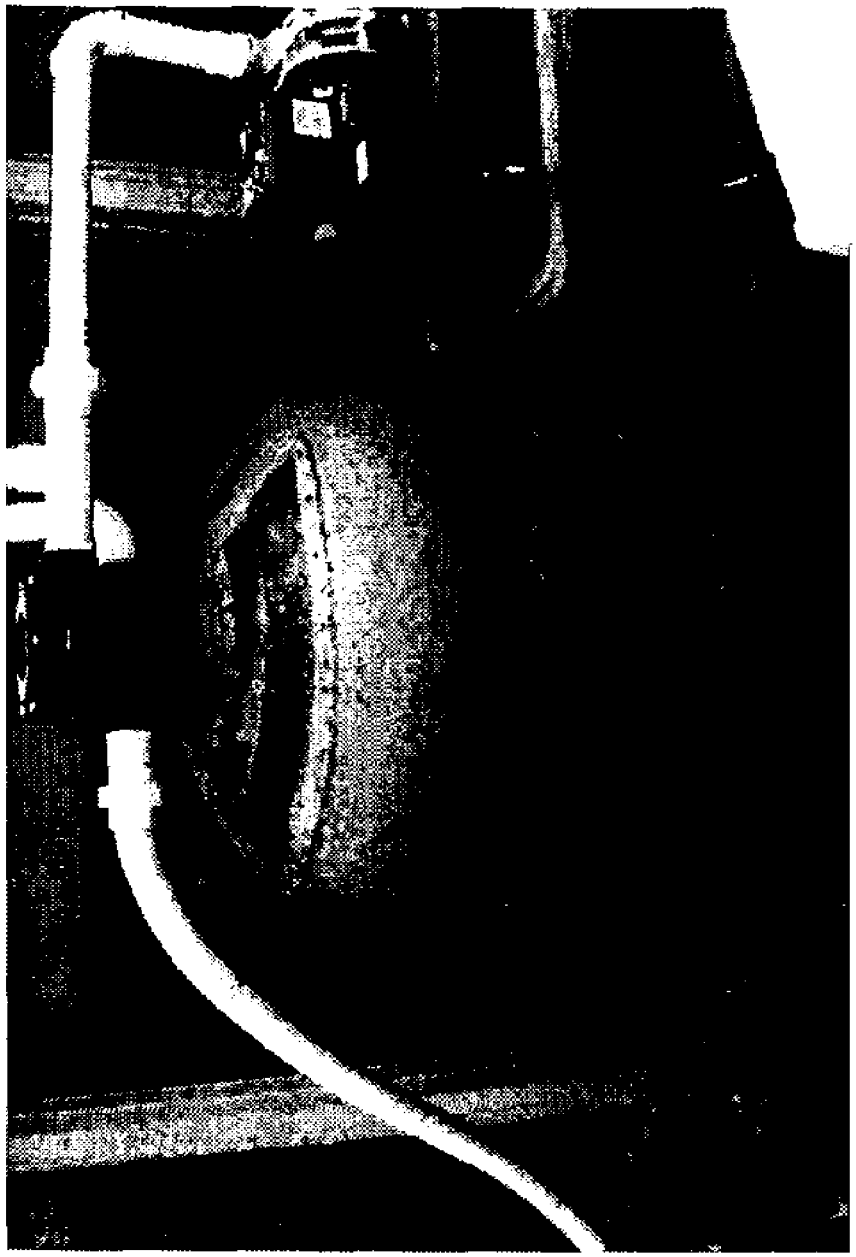
FIG. 22 is a picture showing the filter tank with window(s).

Variation 1: In this alternative embodiment of the invention, the shape of the tank can be varied from a cylinder with two rounded ends to a sphere. But the essential function is that the tank must be made transparent in order to view the inside. Another option is to have cut-out windows on the filter body made with a transparent material, as shown in FIG. 22.

Figure 23:
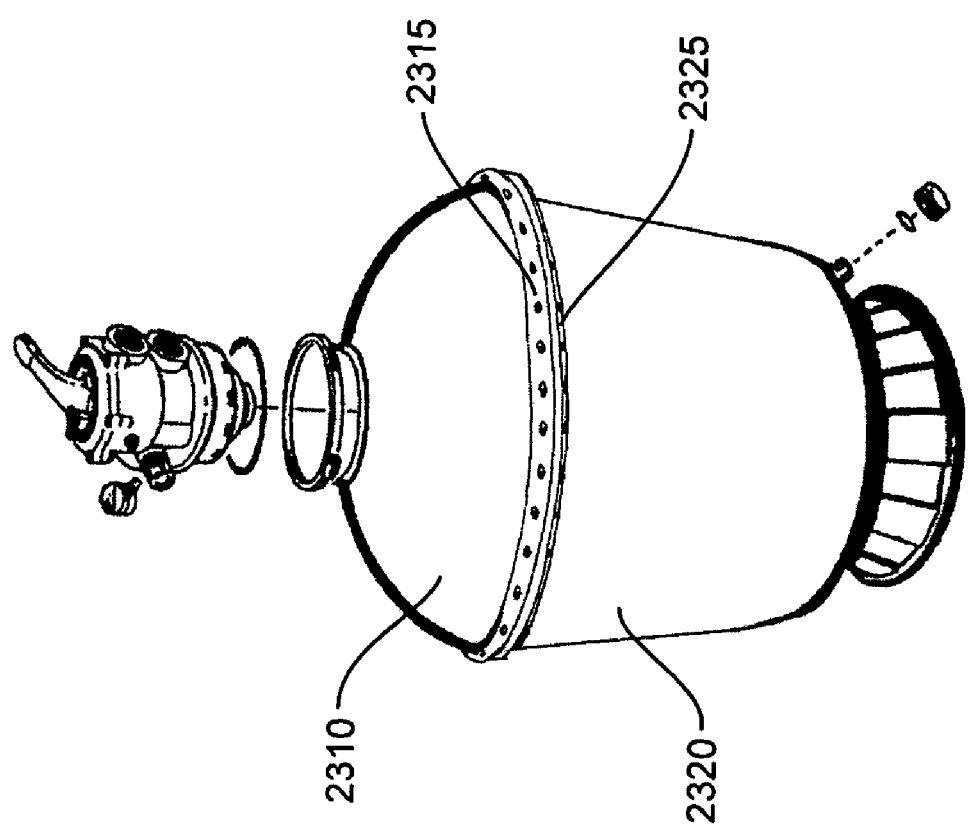
FIG. 23 is a diagram showing a top mounted filter tank with a two-part construction.

Variation 2: In this alternative embodiment of the invention, the filter tank is made in two parts, as shown in FIG. 23. The top part 2310 (called the lid) includes the original 7-inch opening at the top of the filter tank and the body is extended to the shoulder (rounded part of the tank) into a flat rim 2315 with a circumference width the can accommodate screw holes with a hole spacing 2 inches apart.

The lower part 2320 (called the tank) has a slight larger diameter near the bottom. The bottom of the tank is rounded and sealed. The rim of the tank has a flange 2325 that is wide enough to accommodate screw holes with equal spacing of 2 inches a part.

The lid 2310 and the tank 2320 are bolted together and an o-ring is placed between them for a water-tight seal. The assembled lid and the tank together make a whole filter and are supported by a heavy plastic base.

Connection

The best way to describe the inter-connection between main components and sub-components is to describe how the whole system functions.

The filter tank is filled with the biological media up to 85 percent of the filter chamber volume. Water is then added up to the top of the filter tank. Since the biological filter media has a neutral buoyancy, it will be easy to insert the diffuser column later.

Figure 24:
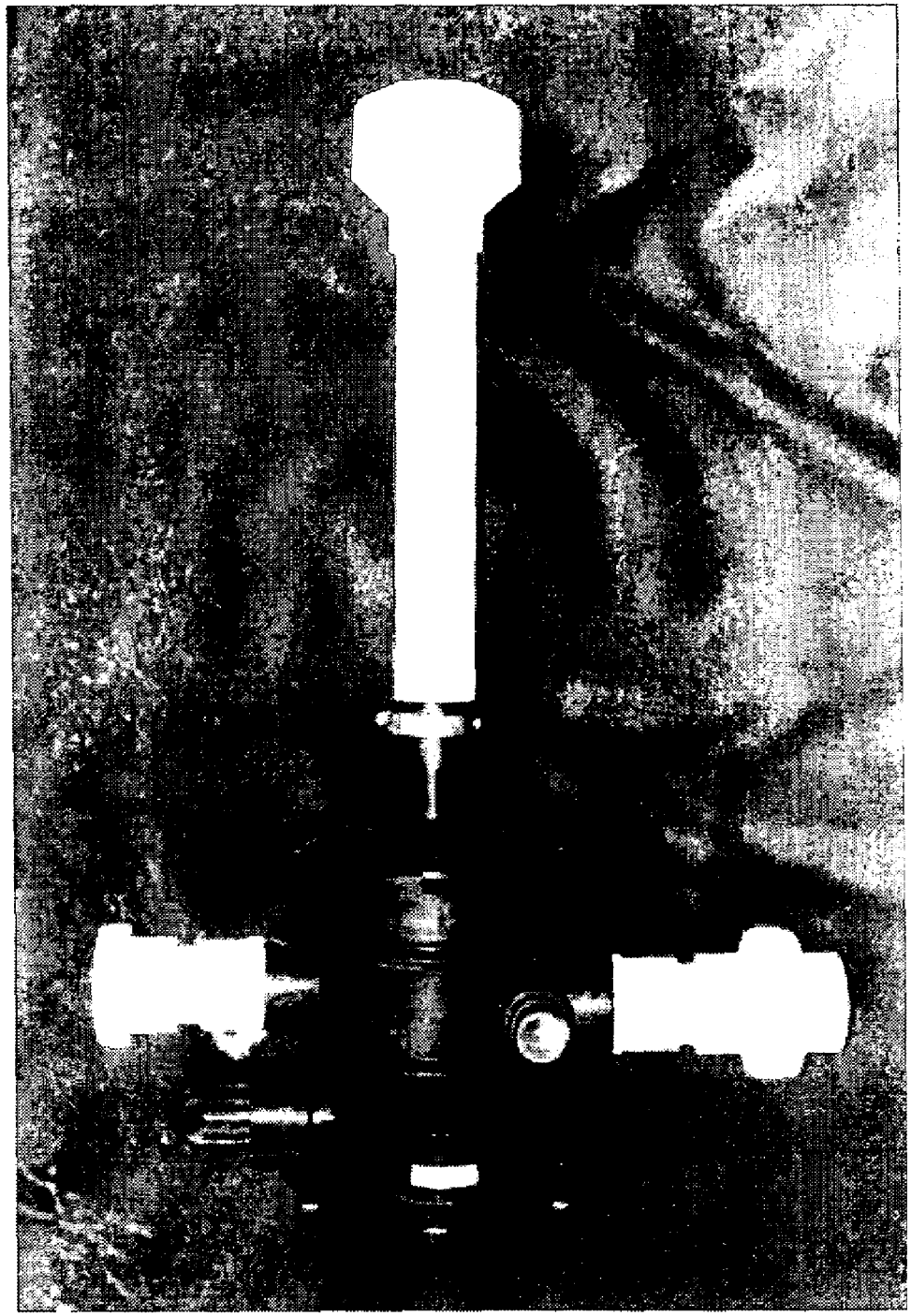
FIG. 24 is an overview of a multi-port valve, strainer, and diffuser column assembly 2400 for a top mounted filter.

Next the diffuser column with diffuser head attached is mounted to the strainer which is attached to the multi-port valve, forming the assembly shown in FIG. 24.

The entire multi-port valve, strainer and diffuser column assembly is now inserted into the filter tank via the opening at the top of the filter tank. The multi-port valve should fit snugly into the opening. The diffuser column with the diffuser head attached is embedded in the biological filter media inside the filter. The diffuser column is extended to the bottom so that the diffuser head is seated near the bottom of the filter tank.

The multi-port valve, strainer and diffuser column assembly is now attached to the filter tank opening using a o-ring clamp. When the flange clamp is tightened, the o-ring is compressed and creates a tight-water seal. The external plumbing is now connected and the filtration system is ready.

Operation

Functionality and Performance of the Invention

The main function of this new design embodied by the invention is to provide a superior and more effective mechanical and biological filtration system, thorough cleaning of the biological media bed with less energy usage, and protection of the bio-film of beneficial bacteria on the media surface.

Component 1, the Biological Filtration Media: The biological filtration media creates a dense packing inside the filter tank chamber, retains dirt and debris as the pond water enters the filter at the top. Not only dirt and debris, but organic matter such as fish waste, is trapped within the media bed. Chemicals and harmful toxins produced by decomposing, decaying plants, and other organic matter are converted to inert organic compounds which are safe for fish. These inert organic compounds are also good nutrients for aquatic plants.

Component 2, The Diffuser Column: The diffuser column provides a steady non-vigorous stir of the bio-media bed in backwash, or cleaning mode, as the water flushes out the contaminants. This operation of the improved design of the invention is in contrast to the use of an air blower, which requires more energy and can reduce the effectiveness of the bio-filter by scrubbing away too much of the bacteria during the cleaning process. Component 3, The Strainer: The strainer is designed to keep large debris such as leaves and plants from entering the filter and only allow dirt, small debris, and fine organic particulates to enter the filter in filtering mode. In backwash, or cleaning mode, the slots are small enough to keep the bio media from escaping the filter and large enough to allow dirt and debris to be flushed out of the filter.

Component 4, The Quick Drain Assembly: The quick drain assembly is a feature for use in larger filter tanks as an energy saver. In backwash, or cleaning mode, the biological filtration media bed is stirred via internal water jets from the diffuser head forming an upward spiral movement of the bio media bed toward the top of the filter tank where dirt and debris are flushed out to the waste line through the multi-port valve. However, as the water begins to exit the filter at the top, the bio media also begins to form a loose packing at the top of the filter.

This packing restricts the dirt and debris from escaping the filter to the waste line and requires thorough flushing with water to remove the remaining dirt and debris trapped within the bio media bed. In order to save water and energy a quick drain tube can be installed to relieve the water pressure at the top of the chamber. This reduces packing of the biological filter media bed at the top of the chamber and allows dirty water to be flushed out both at the top of the filter through the multi-port valve as well as through the quick drain at the bottom.

Component 5, The Filter Tank: The transparent body of the filter tank, or transparent window(s) mounted on the filter tank, provides a user friendly aid that makes it clear when and how much cleaning of the bio-media is needed, thus optimizing the functioning of this filtration system.

Functionality between the Main Components and Sub Components

The two most important modes for the operation of my invention are Filter and Back-wash. The advantages of the invention are seen in the flow of pond water within the filter tank, after entry through the multi-port valve. The flow of pond water from the pond to the multi-port valve is the same as in prior art systems, and is described with reference to FIG. 1. The operation of a pond water filtration system in accordance with the improvements of the invention are described with reference to FIGS. 9 and 10.

Filter Mode: The pond water is drawn by a centrifugal water pump 100 via by a pipe from the pond. Large debris like leaves and plants are first removed at the pump prior to entering the filter via the leaf basket strainer 110 inside the pump. The dirty water with debris and organic materials enters the filter tank through the water inlet 220 of the multi-port control valve 210.

Any large debris that passed through the pump leaf basket strainer 110 is now captured at the strainer 600 (or 700 for the side mounted system) located underneath the multi-port valve 210. The strainer 600/700 has smaller slot openings than the pump leaf basket strainer 110, thus medium size debris are collected in strainer 600/700. The dirty pond water continues to enter the filter tank 270) at the top where with it begins comes in contact with the biological filter media (400 in FIG. 4). The larger particulates are filtered out at the top of the packing while the finer particulates travel through the packing and are trapped within the biological filtration media inside the hollow inner spaces (415 in FIG. 4) of individual media units (405 in FIG. 4), as well as in the interstitial spaces between media units. As the pond water travels to the bottom of the filter tank, it reaches the diffuser head 520 located at the bottom of the filter tank 900 (or 1000 for the side mounted system). Now significantly filtered, the pond water enters the diffuser head 520, travels up through the diffuser column 510 to the top, through the outlet 230 of the multi-port valve 210, and returns to the pond.

This process is repeated many times over depending upon the size of the pond and the re-circulating rate of the pump 100. Filtration of pond water is a continuous process. The pump 100 is continuously running 24 hours-a-day, 365 days-per-year. The amount of dirt and debris accumulated in the filter 600/700 depends upon the amount of feed, debris generated by plants, and blown-in debris around the pond. The average cleaning cycle recommended is not to be exceeded three-week intervals. Although debris are trapped and more effectively collected in the filter tank via the filter and the biological filtration media, and the system according to the invention does not need backwashing as often as other systems, it is strongly recommend that backwashing be done at three-week intervals, because decaying and decomposing materials emit harmful toxic gases into the water and are considered harmful to fish health.

The multi-port valve 210 at the top of the filter has six control functions. By moving the single control handle 200 one can select the different operating modes. The modes are filter, waste, close, backwash, re-circulate, and vent.

The utility and effectiveness of my invention can best be seen in the backwash, or cleaning mode:

Backwash mode: This is the reverse of the filter mode. The single control handle 200 of the multi-port valve is turned to backwash mode. The pond water is drawn by a centrifugal pump 100; large debris such as leaves and plants are collected in the leaf basket strainer 110 inside the pump. The pond water enters the filter tank 900/1000 through the water inlet 220 of the multi-port control valve 210, through the diffuser column 510, exits the diffuser head 520 located at the bottom of the filter tank 900/1000.

The diffuser head 520 has slots that are cut with an angle off the tangent to the inside wall of the diffuser head so that they create spiral water jets as they exit the diffuser head 520. This is a key part of my invention in that these water jets create a spiral and upward movement of the water body inside the filter chamber that is critical for this cleaning process. The upward and spiral movement of the body of the water in the filter chamber causes the biological filtration media (400 in FIG. 4) to move with it. Because the biological filtration media are neutral buoyant it does not take much energy from the water jets to spirally rotate the media bed and move individual units (405 in FIG. 4) toward the top of the filter chamber. Dirt and debris trapped within the biological filtration media bed are unpacked and are circulated by the water exiting the filter at the top.

The strainer 600/700 is designed with small slot openings so that it will retain the biological filtration media inside the filter chamber and allow the dirt and debris to be carried out to the waste line 350 through the multi-port control valve 210. When backwashing is complete, the pump 100 is turned off and by turning the control handle 200 on the multi-port control valve 210, the filter is set back to filter mode. When the pressure created by the water entering the diffuser column exerted on the diffuser head diminishes, the biological filtration media bed is suspended in the water for a few seconds. The biological filtration media then begins to settle back to the bottom of the tank chamber and re-packs. The multi-port valve is set back to filter mode, and the pump 100 is turned back on. Now the filtering is restarted.

The transparent filter tank or filter tank with transparent window(s) is another part of my invention. Visual inspection of the biological filtration media bed (400 in FIG. 4), either when cleaning is needed in filter mode, or to see how thorough cleaning has been in the backwash mode, removes guesswork from the entire filtration process. The transparent filter tank leaves no doubt as to the efficacy of various systems and media. It can save water and electricity by revealing when media are completely clean, or in need of the next cleaning.

The quick drain assembly 800 is another part of my invention. This device can conserve water and energy during the backwash cycle. It is especially designed for larger filter tanks. During backwashing the biological filter media (400 in FIG. 4) tends to form a loose packing at the top of the filter chamber as the dirty water is flushed out of the filter tank 900/1000. This packing restricts the dirt and debris from flushing out of the filter tank; a longer cleaning time to thoroughly remove dirt and debris requires a lot of water and electricity. The quick drain 800 is installed at the bottom of the filter tank with a vertical slotted tube 805 that extends from the bottom of the filter tank to near the top of the filter tank. The top end of the vertical tube 805 is capped and the vertical tube is slotted with small openings 810 that allow the dirt and debris to go through but retain the biological filtration media (400 in FIG. 4) inside the filter chamber. The bottom of the vertical tube 805 is extended through the filter tank wall to the exterior where it is connected to a drain valve 820. The drain valve 820 is opened during the backwash cycle to allow dirty water to go the waste line. It is closed when the cleaning cycle is completed and the system is returned to the filter mode.

While the invention has been described in terms of preferred embodiments, those skilled in the art will recognize that the invention can be practiced with modification within the spirit and scope of the appended claims.

Having thus described my invention, what I claim as new and desire to secure by Letters Patent is as follows:

1. In a pond filtering and cleaning apparatus having a filter tank, a multi-port valve, a strainer, a diffuser head, and biological filter media, an improvement comprising:

hollow tubular biological filter media having a plurality of outside longitudinal ridges and a plurality of valleys extending therebetween, each valley is substantially u-shaped and facilitates preventing interlocking of said filter media; and a plurality of internal free-standing fins comprising a first end, a second end and a body extending therebetween, each fin is coupled to said filter media using said first end and extends radially inward from a tubular portion of said filter media towards a center axis of said filter media such that said second end is positioned at a distance from the center axis of said filter media;

a diffuser head having a substantially cylindrical outside wall that comprises a plurality of substantially vertical slots defined therein, wherein each slot is substantially parallel to a center axis of said diffuser head and oriented at an angle measured with respect to a plane substantially tangent to said outside wall, said slots being spaced evenly around the circumference of said diffuser head and extending slightly into a tapered upper surface of said diffuser head, wherein said plurality of slots are sized to facilitate providing sufficient water pressure to enable an upward spiral movement of water during backwash mode and an unrestricted water flow during a filtering mode.

2. An improved pond filtering and cleaning apparatus as in claim 1, further comprising:

a strainer having a substantially cylindrical upper portion coupled to a unitary conical bottom portion, said unitary conical bottom portion comprises a plurality of evenly spaced radial slots defined therein, said plurality of slots are sized and oriented to facilitate capturing debris during filtering mode, preventing escape of biological filter media during backwash mode, and providing unrestricted water flow.

3. An improved pond filtering and cleaning apparatus as in claim 2, further comprising:

a quick drain assembly.

4. An improved pond filtering and cleaning apparatus as in claim 3, further comprising:

a filter tank being constructed with transparent material so as to permit visual inspection of the biological filter media.

5. An improved pond filtering and cleaning apparatus as in claim 4, wherein said transparent material is a clear plastic window.

6. An improved pond filtering and cleaning apparatus as in claim 1, wherein the biological filter media are made of a plastic material that is neutral buoyant in water.

7. An improved pond filtering and cleaning apparatus as in claim 1, wherein the biological filter media have a diameter in the range of 0.23 to 0.50 inches and a length in the range of 0.37 to 0.50 inches.

8. An improved pond filtering and cleaning apparatus as in claim 7, wherein the biological filter media have a diameter in the range of 0.23 to 0.29 inches and a length in the range of 0.37 to 0.38 inches.

9. An improved pond filtering and cleaning apparatus as in claim 8, wherein the biological filter media have a diameter of 0.25 inches and a length of 0.375 inches.

10. An improved pond filtering and cleaning apparatus as in claim 1, wherein the biological filter media have thirty-six ridges and eight free-standing fins.

11. In a pond filtering and cleaning apparatus having a filter tank, a multi-port valve, a strainer, a diffuser head, and biological filter media, an improvement comprising:

a filter tank being constructed with transparent material so as to permit visual inspection of the biological filter media; and a quick drain assembly comprising a vertical pipe, said quick drain assembly is coupled to said filter tank and positioned within a cavity of said filter tank;

a diffuser head having a substantially cylindrical outside wall that comprises a plurality of substantially vertical slots defined therein, wherein each slot is substantially parallel to a center axis of said diffuser head and oriented at an angle measured with respect to a plane substantially tangent to said outside wall, said slots being spaced evenly around the circumference of said diffuser head and extending slightly into a tapered upper surface of said diffuser head, wherein said plurality of slots are sized to facilitate providing sufficient water pressure to enable an upward spiral movement of water during a backwash mode and an unrestricted water flow during a filtering mode.

12. An improved pond filtering and cleaning apparatus as in claim 11, wherein said transparent material is a clear plastic window.

13. An improved pond filtering and cleaning apparatus as in claim 11, further comprising:

hollow tubular biological filter media having a plurality of outside longitudinal ridges and and a plurality of valleys extending therebetween, each valley is substantially u-shaped and facilitates preventing interlocking of said filter media; and a plurality of internal free-standing fins comprising a first end, a second end and a body extending therebetween, each fin is coupled to said filter media using said first end and extends radially inward from a tubular portion of said filter media towards a center axis of said filter media such that said second end is positioned at a distance from the center axis of said filter media.

14. An improved pond filtering and cleaning apparatus as in claim 11, wherein said quick drain assembly further comprises a plurality of openings large enough to provide water flow for rapid removal of debris within the tank yet small enough to exclude the biological filter media.

15. In a pond filtering and cleaning apparatus having a filter tank, a multi-port valve, a strainer, a diffuser head, and biological filter media, an improvement comprising:

a quick drain assembly comprising a vertical pipe having openings large enough to provide water flow for rapid removal of debris within the tank yet small enough to exclude the biological filter media, said quick drain assembly is coupled to said filter tank and positioned within a cavity of said filter tank;

a diffuser head having a substantially cylindrical outside wall that comprises a plurality of substantially vertical slots defined therein, wherein each slot is substantially parallel to a center axis of said diffuser head and oriented at an angle measured with respect to a plane substantially tangent to said outside wall, said slots being spaced evenly around the circumference of said diffuser head and extending slightly into a tapered upper surface of said diffuser head, wherein said plurality of slots are sized to facilitate providing sufficient water pressure to enable an upward spiral movement of water during a backwash mode and an unrestricted water flow during a filtering mode.

16. An improved pond filtering and cleaning apparatus as in claim 15, wherein the openings are horizontal slots.

17. An improved pond filtering and cleaning apparatus as in claim 16, further comprising:

a filter tank being constructed with transparent material so as to permit visual inspection of the biological filter media.

18. An improved pond filtering and cleaning apparatus as in claim 17, further comprising:

hollow tubular biological filter media having a plurality of outside longitudinal ridges and and a plurality of valleys extending thereberween, each valley is substantially u-shaped and facilitates preventing interlocking of said filter media; and a plurality of internal free-standing fins comprising a first end, a second end and a body extending therebetween, each fin is coupled to said filter media using said first end and extends radially inward from a tubular portion of said filter media towards a center axis of said filter media such that said second end is positioned at a distance from the center axis of said filter media.

19. In a pond filtering and cleaning apparatus having a filter tank, a multi-port valve, a strainer, a diffuser head; and biological filter media, an improvement comprising:

a diffuser head having a substantially cylindrical outside wall that comprises a plurality of substantially vertical slots defined therein, wherein each slot is substantially parallel to a center axis of said diffuser head and oriented at an angle measured with respect to a plane substantially tangent to said outside wall, said slots being spaced evenly around the circumference of said diffuser head and extending slightly into a tapered upper surface of said diffuser head, wherein said plurality of slots are sized to facilitate providing sufficient water pressure to enable an upward spiral movement of water during a backwash mode and an unrestricted water flow during a filtering mode.

20. An improved pond filtering and cleaning apparatus as in claim 19, further comprising:

a filter tank being constructed with transparent material so as to permit visual inspection of the biological filter media.

21. An improved pond filtering and cleaning apparatus as in claim 20, further comprising:

a strainer having a substantially cylindrical upper portion coupled to a unitary conical bottom portion, said unitary conical bottom portion comprises a plurality of evenly spaced radial slots defined therein, said plurality of slots are sized and oriented to facilitate capturing debris during filtering mode, preventing escape of biological filter media during backwash mode, and providing unrestricted water flow.

22. An improved pond filtering and cleaning apparatus as in claim 21, further comprising:

hollow tubular biological filter media having a plurality of outside longitudinal ridges and and a plurality of valleys extending therebetween, each valley is substantially u-shaped and facilitates preventing interlocking of said filter media; and a plurality of internal free-standing fins comprising a first end, a second end and a body extending therebetween, each fin is coupled to said filter media using said first end and extends radially inward from a tubular portion of said filter media towards a center axis of said filter media such that said second end is positioned at a distance from the center axis of said filter media.

23. In a pond filtering and cleaning apparatus having a filter tank, a multi-port valve, a strainer, a diffuser head, and biological filter media, an improvement comprising:

a strainer having a substantially cylindrical upper portion coupled to a unitary conical bottom portion, said unitary conical bottom portion comprises a plurality of evenly spaced radial slots defined therein, said plurality of slots are sized and oriented to facilitate capturing debris during filtering mode, preventing escape of biological filter media during backwash mode, and providing unrestricted water flow;

a diffuser head having a substantially cylindrical outside wall that comprises a plurality of substantially vertical slots defined therein, wherein each slot is substantially parallel to a center axis of said diffuser head and oriented at an angle measured with respect to a plane substantially tangent to said outside wall, said slots being spaced evenly around the circumference of said diffuser head and extending slightly into a tapered upper surface of said diffuser head, wherein said plurality of slots are sized to facilitate providing sufficient water pressure to enable an upward spiral movement of water during a backwash mode and an unrestricted water flow during a filtering mode.

24. An improved pond filtering and cleaning apparatus as in claim 23, further comprising:
a filter tank being constructed with transparent material so as to permit visual inspection of the biological filter media.

25. An improved pond filtering and cleaning apparatus as in claim 23, further comprising:
a quick drain assembly, further comprising a vertical pipe having openings large enough to provide water flow for rapid removal of debris within the tank yet small enough to exclude the biological filter media.

26. An improved pond filtering and cleaning apparatus as in claim 23, wherein a slot length is adjusted to provide an evenly disbursed water flow that does not agitate filter media at the top of the tank.

* * * * *